United States Patent
Gotanda

(10) Patent No.: US 10,397,198 B2
(45) Date of Patent: Aug. 27, 2019

(54) INFORMATION COMMUNICATION SYSTEM, INFORMATION COMMUNICATION PROGRAM, AND INFORMATION COMMUNICATION METHOD

(71) Applicant: Prime Brains, Inc., Tokyo (JP)

(72) Inventor: Motohide Gotanda, Tokyo (JP)

(73) Assignee: PRIME BRAINS, INC., Tokyo (JP)

( * ) Notice: Subject to any disclaimer, the term of this patent is extended or adjusted under 35 U.S.C. 154(b) by 0 days.

(21) Appl. No.: 16/009,173

(22) Filed: Jun. 14, 2018

(65) Prior Publication Data
US 2018/0302384 A1   Oct. 18, 2018

Related U.S. Application Data

(63) Continuation of application No. PCT/JP2016/087211, filed on Dec. 14, 2016.

(51) Int. Cl.
*H04L 29/06* (2006.01)
*G06F 21/60* (2013.01)
(Continued)

(52) U.S. Cl.
CPC .......... *H04L 63/0428* (2013.01); *G06F 21/60* (2013.01); *G06F 21/602* (2013.01);
(Continued)

(58) Field of Classification Search
CPC ..... H04L 63/0428; H04L 67/02; H04L 51/08; H04L 9/3226; H04L 9/32; H04L 9/08; G06F 21/602; G06F 21/60
See application file for complete search history.

(56) References Cited

U.S. PATENT DOCUMENTS 6,351,536 B1    2/2002 Sasaki
7,600,121 B2 *  10/2009 Davin ................. H04L 9/12
                                          380/260
(Continued)

FOREIGN PATENT DOCUMENTS

CN    103442059 A    12/2013
EP     2955900 A     12/2015
(Continued)

OTHER PUBLICATIONS

Written opinion of ISA/JP dated Jan. 17, 2017.
(Continued)

*Primary Examiner* — Christopher C Harris
(74) *Attorney, Agent, or Firm* — Symbus Law Group, LLC; Clifford D. Hyra

(57) ABSTRACT

An information communication system has a plug-in stored in a transmitting terminal and a second program stored in a cloud server. The cloud server is configured to communicate with the transmitting terminal and a receiving terminal through the Internet W in a confidential state. The plug-in generates an encryption password 8 for encrypting an attachment file and transmits the encryption password to the cloud server. The second program determines whether or not a receiver e-mail address is registered, generates a first URL information, and transmits the first URL information to the transmitting terminal. The plug-in generates an e-mail including the encrypted attachment file and the first URL information, and the second program returns the encryption password to the receiving terminal when an access to the first URL from the receiver is authenticated.

8 Claims, 18 Drawing Sheets

(51) Int. Cl.
*H04L 9/08* (2006.01)
*H04L 9/32* (2006.01)
*H04L 12/58* (2006.01)
*H04L 29/08* (2006.01)

(52) U.S. Cl.
CPC ............... *H04L 9/08* (2013.01); *H04L 9/32* (2013.01); *H04L 9/3226* (2013.01); *H04L 51/08* (2013.01); *H04L 67/02* (2013.01)

(56) References Cited

U.S. PATENT DOCUMENTS

| | | | | |
|---|---|---|---|---|
| 7,702,107 | B1* | 4/2010 | Messing | H04L 51/066 380/259 |
| 8,806,190 | B1* | 8/2014 | Munshi | H04L 63/0428 713/153 |
| 2003/0065941 | A1 | 4/2003 | Ballard et al. | |
| 2014/0052990 | A1* | 2/2014 | Dogu | H04L 63/0428 713/171 |
| 2015/0052355 | A1* | 2/2015 | Munshi | H04L 63/0428 713/168 |
| 2015/0081588 | A1 | 3/2015 | Grammas et al. | |
| 2015/0256336 | A1* | 9/2015 | Stiglic | H04L 9/0822 380/281 |
| 2015/0271146 | A1* | 9/2015 | Holyfield | H04L 63/0428 713/171 |

FOREIGN PATENT DOCUMENTS

| | | |
|---|---|---|
| JP | 11-168460 A | 6/1999 |
| JP | 2004-350084 A | 12/2004 |
| JP | 2005-217808 A | 8/2005 |
| JP | 4 648413 B2 | 3/2011 |
| WO | 2015/027814 A | 3/2015 |
| WO | WO 2015/027814 A1 | 3/2015 |

OTHER PUBLICATIONS

International Preliminary Report on Patentability of ISA/JP dated Jun. 19, 2018.
International Search Report of ISA/JP dated Jan. 17, 2017.
European Search Report (PCTJP2016/087211) dated Jun. 21, 2019.

* cited by examiner

| RECEIVER E-MAIL ADDRESS | RECEIVER PASSWORD | ... | ... | ... |
|---|---|---|---|---|
| ... | ... | ... | ... | ... |
| bbb@yyy.jp | ***** | ... | ... | ... |
| ccc@zzz.com | ***** | ... | ... | ... |
| ... | ... | ... | ... | ... |

75 — RECEIVER E-MAIL ADDRESS
58 — RECEIVER PASSWORD
D2a, D2b

| FIRST URL INFORMATION | ENCRYPTION PASSWORD | SENDER E-MAIL ADDRESS | LICENSE NUMBER | ... |
|---|---|---|---|---|
| ***** | ***** | ***** | ***** | ***** |
| https://sss.com/xyz123 | 1234abcd5678efgh | aaa@xxx.com | TUVWXYZ67890 | ***** |
| ***** | ***** | ***** | ***** | ***** |

| FIRST URL INFORMATION | RECEIVER E-MAIL ADDRESS | PASSWORD ACQUISITION STATUS | ... |
|---|---|---|---|
| ..... | ..... | ..... | ..... |
| https://sss.com/xyz123 | bbb@yyy.jp | "NOT ACQUIRED" | ..... |
| https://sss.com/xyz123 | ccc@zzz.com | "ACQUIRED" | ..... |
| ..... | ..... | ..... | ..... |

FIG. 6

| LICENSE NUMBER | CONTRACT DOMAIN AND MAIL ADDRESS | CONTRACT ARRANGEMENT | ... |
|---|---|---|---|
| ..... | ..... | ..... | ..... |
| TUVWXYZ67890 | aaa@xxx.com | "INDIVIDUAL ADDRESS" | ..... |
| TUVWXYZ67891 | @yyy.jp | "DOMAIN" | ..... |
| ..... | ..... | ..... | ..... |

FIG. 7

INFORMATION COMMUNICATION SYSTEM, INFORMATION COMMUNICATION PROGRAM, AND INFORMATION COMMUNICATION METHOD

CROSS-REFERENCE TO RELATED APPLICATION

The present application is a continuation application of International Application No. PCT/JP2016/087211, filed Dec. 14, 2016, which claims priority to PCT/JP2015/084982, filed Dec. 14, 2015. The contents of these applications are incorporated herein by reference in their entirety.

BACKGROUND

Field

The present invention relates to an information communication system, an information communication program, and an information communication method, and in particular, to an information communication system and the like capable of securely providing an encryption password for an attachment file attached to a transmission information such as an e-mail or the like, toward a transmission destination.

Description of the Related Art

Conventionally, as a method of transmitting and receiving an electronic file, there is a method of attaching an electronic file to an e-mail to transmit an e-mail with an attachment file attached thereto. In the case of transmitting and receiving an electronic file including confidential information, the electronic file may be attached to an e-mail after being encrypted. As a method of encrypting an electronic file, there is a common key encryption method. The common key encryption method is a method wherein a same (common) password at the time of encryption and at the time of decryption of an electronic file is used.

In the case of transmitting and receiving an electronic file encrypted by using the common key encryption method, a password is determined on the transmitting side, and the password is transmitted to the receiving side. The method of describing a password in the main text (text sentence) of an e-mail and communicating the password to the reception side is not always secure. This is because a possibility that a third party take a peek the message body cannot be excluded due to the nature of the e-mail which communicates information through the Internet.

As a method for securely informing a key information such as a password to the reception side, for example, there has been proposed a method of encrypting an e-mail or an attachment file, then dividing the decryption key into two parts, transmitting one part of the key together with the encrypted e-mail, and transmitting the other part of the key together with another e-mail (for example, refer to Patent Document 1: JP 2001-60944 A). According to this, it is taught that the risk that the decryption key is intercepted can be reduced compared with a case of transmitting the decryption key in one e-mail.

In the method disclosed in Patent Document 1, however, since the decryption key itself is not encrypted but transmitted in plaintext, there still remains the risk that the decryption key is leaked. In particular, in a case where both of the two e-mails transmitted which the decryption key divided into two parts are intercepted, leakage of the decryption key cannot be avoided.

The invention has been made in view of the above circumstances, and it is an exemplary object of the invention to provide an information communication system, an information communication program, and an information communication method capable of more securely informing a password, which is used for encryption of an attachment file attached to transmission information, to a destination while preventing interception by a third party through use of a conventional information transmitting and receiving method, such as an e-mail software.

SUMMARY

In order to solve the aforementioned problem, the invention has the following configuration.

(1) An information communication system includes: a first program stored in a first terminal; and a second program stored in a second terminal. The first terminal is configured to transmit transmission information. The second terminal is configured to communicate with the first terminal through the Internet in a confidential state and to communicate with a third terminal configured to receive the transmission information through the Internet in a confidential state. The transmission information is an information transmitted from a transmission source (hereinafter also referred to as "source") to a transmission destination (hereinafter also referred to as "destination") and includes a message body information including text data and an attachment file attached to the message body information. The first program having an encryption password generation means generating an encryption password for encryption processing of the attachment file; an encryption means performing encryption processing to the attachment file using the encryption password; an encryption password transmission means transmitting information of the encryption password to the second terminal in a confidential state; and a destination transmission means transmitting information of the transmission destination to the second terminal in a confidential state. The second program has a first determination means determining whether or not the information of the transmission destination is registered in the second terminal; and an URL information processing means generating a first URL information associated with the information of the encryption password and transmitting the first URL information to the first terminal. The first program further has a transmission preparation means generating a first transmission information which is a transmission information including the first URL information in the message body information and to which an attachment file obtained by performing the encryption processing is attached to the main body information. The second program further has an authentication processing means performing authentication processing for determining whether or not to permit access to a first URL corresponding to the first URL information included in the first transmission information from the third terminal; and an encryption password returning means returning the information of the encryption password to the third terminal in a confidential state in a case where the access is permitted in the authentication processing. In a case where the first determination means determines that at least a part of the information of the transmission destination is not registered, the URL information processing means generates a second URL information related to an information of an unregistered transmission destination and transmits the second URL information to the first terminal, and the transmission preparation means generates a second transmission information including the second URL information in the message body information and directed to the unregistered transmission destination.

Further objects or other features of the invention will be apparent from the preferred embodiments described with reference to the accompanying drawings.

According to the invention, it is possible to provide an information communication system, an information communication program, and an information communication method capable of more securely informing a password, which is used for encryption of an attachment file attached to transmission information, to a transmission destination while preventing interception by a third party through use of a conventional information transmitting and receiving method, such as an e-mail software.

BRIEF DESCRIPTION OF THE DRAWINGS

FIG. 4 is a database configuration diagram of a receiver account information database D2 of the first embodiment.

FIG. 5 is a database configuration diagram of an encryption password information database D3 of the first embodiment.

FIG. 6 is a database configuration diagram of a receipt information database D4 of the first embodiment.

FIG. 7 is a database configuration diagram of a license information database D1 of the first embodiment.

DETAILED DESCRIPTION

[First Embodiment]

Hereinafter, an information communication system according to a first embodiment will be described with reference to the diagrams.

Figure 1:
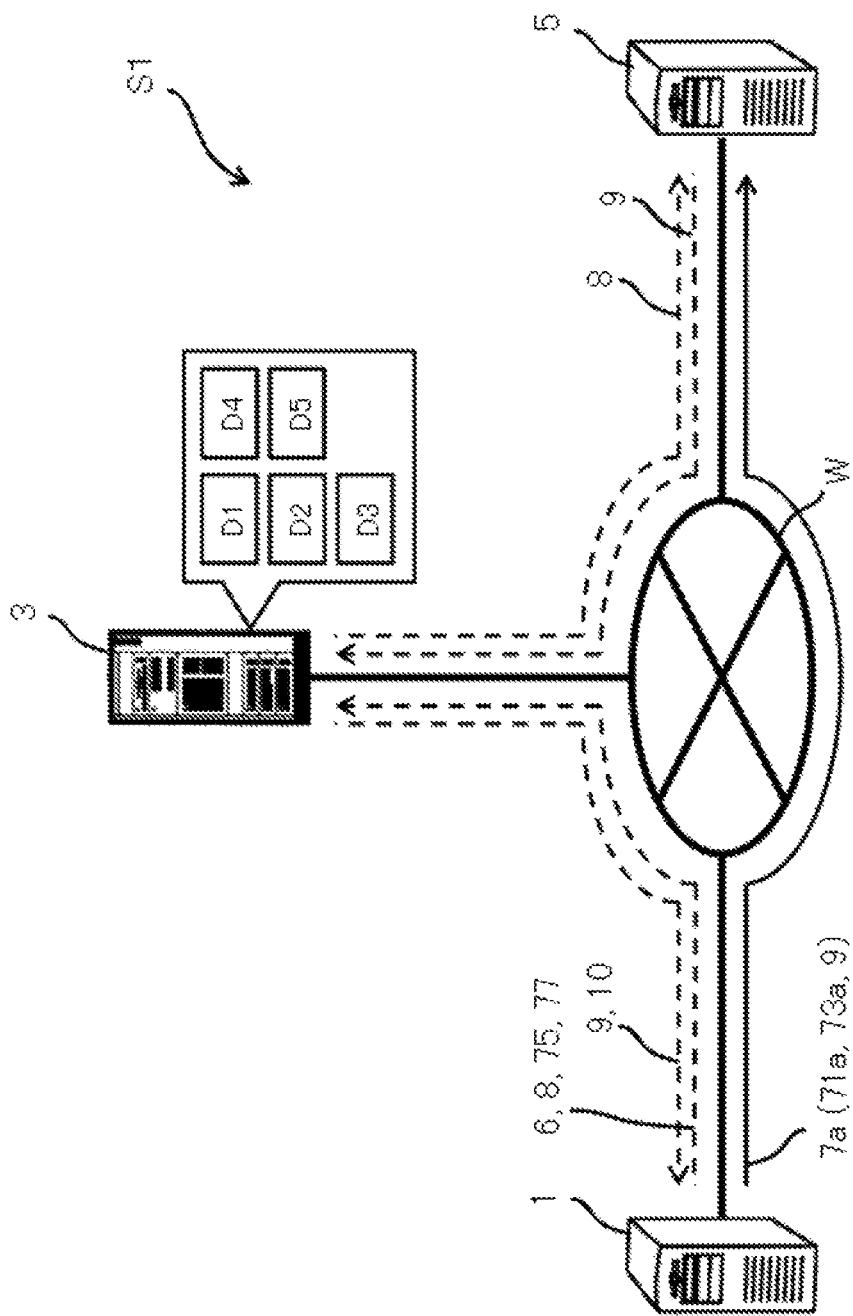
FIG. 1 is a schematic configuration diagram illustrating the overall configuration of an information communication system S1 according to a first embodiment.

FIG. 1 is a schematic configuration diagram illustrating the overall configuration of an information communication system S1 according to the first embodiment. In the information communication system S1, a first terminal 1, a second terminal 3, and a third terminal 5 are connected so as to communicate with each other through the Internet W. Specifically, the first terminal 1 is a computer or the like used by a sender as a transmission source which transmits transmission information 7. Specifically, the second terminal 3 is a cloud server or the like. Specifically, the third terminal 5 is a computer or the like used by a receiver as a transmission destination which receives the transmission information 7. Here, communication can be performed in a confidential state between the first terminal 1 and the second terminal 3 and between the third terminal 5 and the second terminal 3 confidential state (in FIG. 1, the flow of information that can be communicated in a confidential state is indicated by dotted arrows). The following explanation will be given on the basis that the first terminal 1 is a transmitting terminal, the second terminal 3 is a cloud server, and the third terminal is a receiving terminal in the first embodiment.

The transmission information 7 transmitted by the information communication system S1 according to the first embodiment includes an e-mail, an e-mail with an attachment file, an e-mail generated according to the content of input to a WEB form, a message of a message exchange function provided as a part of social networking service (SNS) and the like. In the first embodiment, a case where the transmission information 7 is an e-mail with an attachment file is mainly described.

The transmission information 7 is an information transmitted from the transmission source to the transmission destination. Information 77 of the transmission source is, for example, a sender e-mail address in a case where the transmission information 7 is an e-mail, and information 75 of the transmission destination is, for example, a receiver e-mail address (addressee e-mail address) in a case where the transmission information 7 is an e-mail.

The transmission information 7 is transmitted by a first information transmitting and receiving program 13 of the transmitting terminal 1 and is received by a second information transmitting and receiving program 53 of the receiving terminal 5. Examples of the first information transmitting and receiving program 13 or the second information transmitting and receiving program 53 include an e-mail transmitting and receiving program (mailer), a social networking service program, and the like. In a case where the transmission information 7 is an e-mail, the first information transmitting and receiving program 13 and the second information transmitting and receiving programs 53 are e-mail transmitting and receiving programs, such as a mailer.

The transmission information 7 includes message body information 71 and an attachment file 73 attached to the message body information. The message body information 71 is a substantial part of the e-mail and means an e-mail body (not including an attachment file). The attachment file 73 may be any of a text file, an executable file, and the like as long as the attachment file 73 is an electronic data which can be transmitted as the transmission information 7, and the type (extension) of the file is not particularly limited. In addition, both the message body information 71 and the attachment file 73 may be intercepted by a third party in a communication through the Internet W unless a special encryption means is used.

In FIG. 1, the cloud server 3 is shown as a single server. However, functions (first determination means 3M1, URL information processing means 3M2, authentication processing means 3M3, encryption password returning means 3M4, and second determination means 3M5; described later) as a cloud server may be distributed to a plurality of servers. In a case where these functions are distributed to a plurality of servers, the servers to which the functions are distributed may communicate with each other in a confidential state.

Hereinafter, the transmitting terminal 1 which stores a first program (a part of an information communication program) 14, the cloud server 3 which stores a second program (a part of an information communication program) 33, and the receiving terminal 5 which receives an e-mail 7 from the transmitting terminal 1 is described in more detail with reference to the diagrams.

Figure 2:
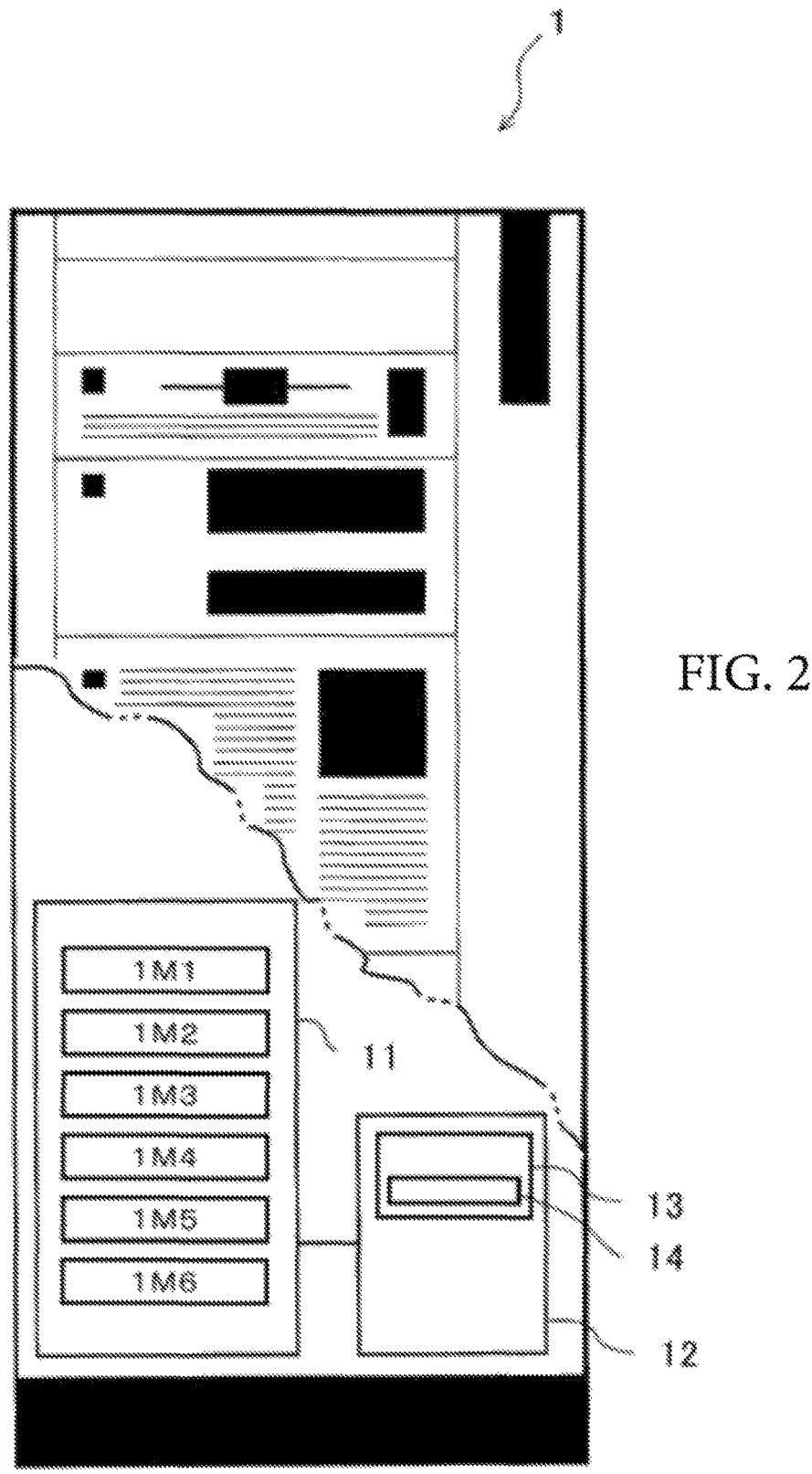
FIG. 2 is a block diagram schematically illustrating the internal configuration of a transmitting terminal 1 of the first embodiment.

FIG. 2 is a block diagram schematically illustrating the internal configuration of the transmitting terminal 1. The transmitting terminal 1 includes a processor (CPU) 11 and a storage device (memory) 12 thereinside. In the first embodiment, the e-mail transmitting and receiving program 13 and the first program 14 are stored in the memory 12. Here, the first program 14 functions as a plug-in program included in the e-mail transmitting and receiving program 13. Needless to say, the first program 14 may have a function of the e-mail transmitting and receiving program 13, so that transmitting and receiving information can be performed by using only the first program 14. From the viewpoint of using an existing transmitting and receiving method, the first program 14 is preferably a plug-in program which can be additionally included after the installation of the existing e-mail transmitting and receiving program 13. In the first embodiment, the first program 14 causes the transmitting terminal 1 (or CPU 11 as a main part thereof) to function as encryption password generation means 1M1, encryption means 1M2, encryption password transmission means 1M3, transmission preparation means 1M4, and destination addition means 1M5. In the first embodiment, explanation is given on the basis that the first program 14 is a plug-in program (hereinafter, abbreviated as a plug-in).

<Encryption Password Generation Means 1M1>

The encryption password generation means 1M1 has a function of generating an encryption password 8 for encryption processing of the attachment file 73 after receiving a command signal related to the start of processing for transmitting the e-mail 7. Here, the transmission processing means processing which is started by a transmission button being pressed in the first information transmitting and receiving program (e-mail transmitting and receiving program) 13 or the like stored in the transmitting terminal 1 and in which the transmission information (e-mail) 7 is transmitted from the first terminal (transmitting terminal) 1 as the transmission source to the third terminal (receiving terminal) 5 of the transmission destination. Specifically, when the transmission button of the e-mail transmitting and receiving program 13 is pressed, a command signal related to the start of transmission processing is transmitted, and the command signal is received by the plug-in 14. When the command signal is received, processing in the plug-in 14 is started. The command signal related to the start of transmission processing is, for example, a command signal generated by pressing the transmission button of the e-mail transmitting and receiving program 13 being pressed.

In the first embodiment, the encryption password 8 generated by the encryption password generation means 1M1 is varied in every e-mail 7. It is preferable that the encryption password 8 generated for one e-mail 7 is not the same as an encryption password generated for another e-mail. The encryption password 8 can be a character string having no regularity and randomly generated. As the encryption password 8, any number of digits can be set. The encryption password 8 can be used as an encryption key in the encryption processing of the encryption means 1M2.

<Encryption Means 1M2>

The encryption means 1M2 has a function of generating an attachment file which is encrypted (encrypted attachment file) 73a by releasing the attachment of the attachment file 73 from the e-mail 7 and performing encryption processing to the attachment file 73 using the encryption password 8 generated by the encryption password generation means 1M1. The encryption method is not particularly limited, and any encryption method based on the common key encryption method can be adopted. That is, any method of encrypting an arbitrary file with an arbitrary encryption (decryption) password and decrypting the encrypted file with the same encryption (decryption) password (common key encryption method) can be applied to the first embodiment.

<Encryption Password Transmission Means 1M3>

The encryption password transmission means 1M3 has a function of transmitting the encryption password 8 generated by the encryption password generation means 1M1 to the cloud server 3 in a confidential state. Here, the transmission in a confidential state means a communication using an encryption technique between terminals. As the encryption technique for communication in a confidential state, for example, an encryption technique, such as secured sockets layer (SSL) or transport layer security (TLS), can be adopted.

<Transmission Destination Transmission Means 1M6>

The destination transmission means 1M6 has a function of transmitting the information 75 of a transmission destination to the cloud server 3 in a confidential state. Incidentally, in the first embodiment, a case is described in which the encryption password 8 and the information 75 of the transmission destination are transmitted from the transmitting terminal 1 to the cloud server 3 by one transmission processing by combining the encryption password transmission means 1M3 and the destination transmission means 1M6.

In addition to transmitting the encryption password 8 or the information (receiver e-mail address) 75 of the transmission destination to the cloud server 3, the encryption password transmission means 1M3 or the destination transmission means 1M6 may transmit the information of the transmission source (sender e-mail address) 77 or source identifying information (license information) 6 for identifying the transmission source. The license information 6 can be used so that the second determination means 3M5 of the cloud server 3 can determine whether or not the license information 6 is registered in the cloud server 3. Incidentally, the subject of execution of transmission of the license information 6 is not limited to the encryption password transmission means 1M3 and the destination transmission means 1M6. Any means corresponding to each function realized by the transmitting terminal 1 by the plug-in 14 may be the subject of execution to transmit the license information 6 to the cloud server 3.

<Transmission Preparation Means 1M4>

The transmission preparation means 1M4 has a function of generating a first transmission information (e-mail) 7a in which a first URL information 9 is included in the message body information 71 of the e-mail 7 and to which an attachment file (encrypted attachment file 73a) obtained by performing encryption processing message body information is attached to the message body information 71. Here, the first URL information 9 is an URL information generated by the URL information processing means 3M2 of the second program 33 (described later) and is an URL information associated with the encryption password 8.

In the first embodiment, the transmission preparation means 1M4 acquires the first URL information 9 generated by the URL information processing means 3M2 of the second program 33 and adds the first URL information 9 to the message body information 71 of the e-mail 7. As the content of the first URL information 9 to be added to the message body information 71, for example, the first URL information 9 can be indicated as a text data together with a guide message prompting the receiver to access the first URL. In addition, by setting a link to the description of the first URL information 9, it is possible to provide an easier access to the URL indicated by the first URL information 9 (hereinafter, referred to as a first URL) for the receiver by clicking the description portion of the first URL information 9.

The transmission preparation means 1M4 generates the first transmission information (e-mail) 7a by attaching the encrypted attachment file 73a together with the message body information 71a to which the first URL information 9 is added as described above. When attaching the encrypted attachment file 73a, the transmission preparation means 1M4 releases the attachment of the attachment file 73 to the e-mail 7 before encryption, the attachment file 73 being attached in advance to the e-mail 7 by the sender, to the e-mail 7. Specifically, for example, in a case where the information of the attachment file 73 is temporarily stored in the storage device 12 as a part of the information of the e-mail 7, the release of the attachment of the attachment file 73 to the e-mail 7 can be realized by deleting the information of the attachment file 73 as a part of the information of the e-mail 7 from the storage device 12. Incidentally, in a case where the information of the attachment file 73 is a location information (path) in the storage device 12 in which the original data of the attachment file 73 is stored, the release of the attachment of the attachment file 73 to the e-mail 7 can be realized by deleting the path.

After the first transmission information (e-mail) 7a is generated, the processing is handed over to the e-mail transmitting and receiving program 13. The generated first transmission information (e-mail) 7a is transmitted to the transmission destination by the e-mail transmitting and receiving program 13. Incidentally, the first transmission information (e-mail) 7a transmitted by the e-mail transmitting and receiving program 13 is transmitted using a common e-mail-transmission method. That is, the e-mail body to which the encrypted attachment file is attached is transmitted as an e-mail by the e-mail transmitting and receiving program. In this case, it is not necessary for the e-mail transmitting and receiving program 13 to execute special encryption processing or the like. There is no need for the sender to perform an encryption procedure for encrypting the attachment file.

<Transmission Destination Addition Means 1M5>

The destination addition means 1M5 has a function of adding a transmission source to the transmission destination in a case where the transmission source is not included in the transmission destination in the e-mail 7. For example, in a case where the e-mail address of the sender (transmission source) is not included in the transmission destination, it is preferable to add the e-mail address of the sender (transmission source) to the transmission destination. Specifically, it is possible to set the sender e-mail address as carbon copy (CC) information or blind carbon copy (BCC) information set in the e-mail. Needless to say, instead of the carbon copy (CC) information or the blind carbon copy (BCC) information, the sender e-mail address may be set as the addressee information. By adding the transmission source to the transmission destination, the sender can also be notified of the first URL information 9 for acquiring the encryption password 8. Therefore, the encryption password 8 can be checked by accessing the first URL also on the sender side. Incidentally, as other method of notifying the sender of the encryption password 8, for example, it is conceivable to give a password display function to the first program 14, wherein the password display function displays the encryption password 8 generated by the encryption password generation means 1M1 on the display screen of the transmitting terminal 1.

Figure 3:
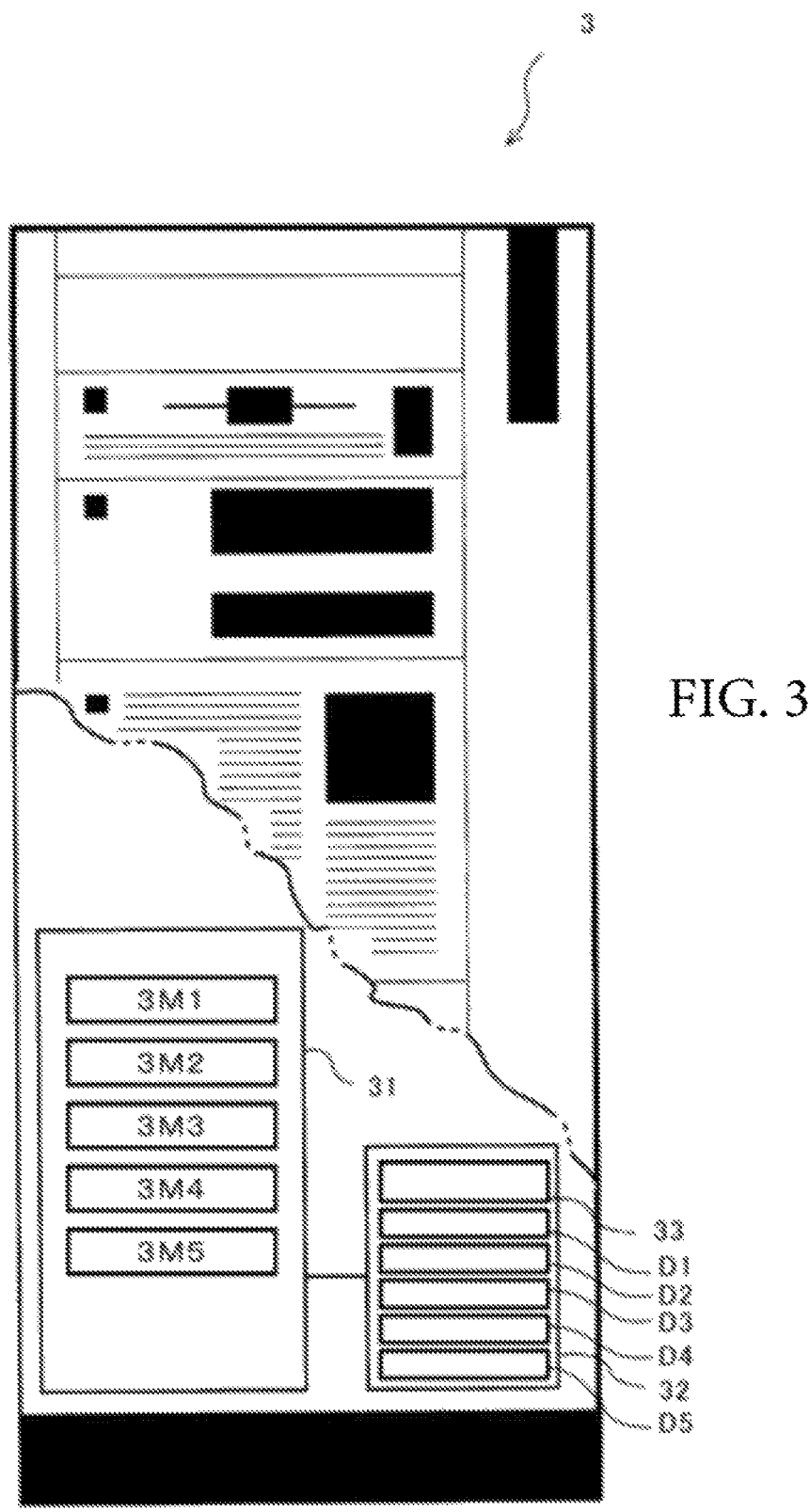
FIG. 3 is a block diagram schematically illustrating the internal configuration of a cloud server 3 of the first embodiment.

FIG. 3 is a block diagram schematically illustrating the internal configuration of the cloud server 3. The cloud server 3 includes a processor (CPU) 31 and a storage device (memory) 32 thereinside. The second program 33 is stored in the memory 32. In the first embodiment, the second program 33 allows the cloud server 3 (or a CPU 31 as a main part thereof) to function as the first determination means 3M1, the URL information processing means 3M2, the authentication processing means 3M3, the encryption password returning means 3M4, and the second determination means 3M5. In addition, a license information database D1, a receiver account information database D2, an encryption password information database D3, a receipt information database D4, and a receiver registration temporary URL information database D5 are stored in the memory 32.

<First Determination Means 3M1>

The first determination means 3M1 has a function of receiving the information 75 of the transmission destination transmitted by the encryption password transmission means 1M3 of the first program 14 described above and determining whether or not the information 75 of the transmission destination is registered in the cloud server 3. Specifically, according to whether or not the information 75 of the transmission destination is present in the receiver account information database D2 stored in the memory 32 of the cloud server 3, it is determined whether or not the information 75 of the transmission destination is registered in the cloud server 3. For example, the determination can be made according to whether or not a record including the receiver e-mail address (information of the transmission destination) 75 is present in the receiver account information database D2 shown in FIG. 4. FIG. 4 is a database configuration diagram of the receiver account information database D2. The receiver account information database D2 is constructed by associating the information of the receiver e-mail address 75 with information of the receiver password 58 set by the receiver. In FIG. 4, records D2a and D2b are shown as examples.

<URL Information Processing Means 3M2>

The URL information processing means 3M2 has a function of generating the first URL information 9 associated with the information of the encryption password 8 and transmitting the first URL information 9 to the transmitting terminal 1. In the first embodiment, a case where the first determination means 3M1 determines that the information 75 of the transmission destination is registered in the second terminal 3 is described. In a case where the receiver e-mail address 75 is present in the receiver account information database D2, the URL information processing means 3M2 generates the first URL information 9 associated with the information of the encryption password 8 and transmits the first URL information 9 to the transmitting terminal 1, as the next processing. The first URL information 9 is added to the message body information 71 of the e-mail 7 by the transmission preparation means 1M4 of the first program 14.

The generated first URL information 9 is added to the encryption password information database D3 shown in FIG. 5 as a new record together with the encryption password 8 and the like. FIG. 5 is a database configuration diagram of the encryption password information database D3. The encryption password information database D3 is constructed by associating at least the first URL information 9 and the information of the encryption password 8 with each other. In FIG. 5, the encryption password information database D3 in which not only the first URL information 9 and the encryption password 8 but also the sender e-mail address 77 and the license information 6 are associated with each other is shown. As an example, a record D3a is shown.

The first URL information 9 is an URL information generated in association with the encryption password 8 and is a location information of a site page where the receiver accesses to acquire the information of the encryption password. The first URL information 9 is varied in each encryption password 8. That is, it is preferable that there is no case where the first URL information 9 generated for a certain encryption password 8 is the same to the first URL information 9 generated for another encryption password 8.

The first URL information 9 may be the whole (full path) of the location information (full path) of a site page where the receiver accesses to acquire the information of the encryption password or may be a part thereof. That is, in a case where the first URL information 9 is a part of the location information of the site page, the part may be generated so as to be uniquely associated with the encryption password 8, and a portion other than the part may be common to the first URL information generated for other encryption passwords. Incidentally, in the first embodiment, a case where the first URL information 9 is a full path is described.

<Authentication Processing Means 3M3>

The authentication processing means 3M3 has a function of executing authentication processing for determining whether or not to permit an access in a case where the receiver accesses a first URL corresponding to the first URL information 9 from the receiving terminal 5. When the first transmission information (e-mail) 7a is generated by the transmission preparation means 1M4 and transmitted to the receiver by the e-mail transmitting and receiving program 13, the receiver is prompted by the guide sentence indicated in the message body information 71a of the first transmission information (e-mail) 7a and attempts to access the first URL. Then, the authentication processing means 3M3 determines whether or not to permit the access to the first URL from the receiving terminal 5 used by the receiver.

Specifically, in the authentication processing of the authentication processing means 3M3, first, when the second program 33 detects an access request to the first URL by the receiving terminal 5, the second program 33 returns a receiver account information input form requesting the input of the receiver e-mail address 75 and the receiver password 58 to the receiving terminal 5. Then, when the receiver inputs the receiver e-mail address 75 and the receiver password 58 of the receiver himself or herself to the receiver account information input form received by the receiving terminal 5 and displayed on the display screen, these are transmitted to the cloud server 3. The second program 33 which has received the receiver e-mail address 75 and the receiver password 58 compares the received receiver e-mail address 75 and receiver password 58 with the receiver account information database D2 and permits access to the first URL by the receiving terminal 5 through authentication in a case where a record matching the received receiver e-mail address 75 and receiver password 58 is present. Since the receiver e-mail address 75 and the receiver password 58 are associated with each other, both the receiver e-mail address 75 and the receiver password 58 need to be registered in the same record for the authentication. In a case where the authentication fails, the second program 33 can notify the receiving terminal 5 that the authentication has failed and block the receiving terminal 5 from accessing the first URL.

A deadline can be set for a period from the transmission of the first transmission information (e-mail) 7a to the reception of the access to the first URL by the receiver. That is, by setting the deadline for the access to the first URL and the acquisition of the encryption password 8 by the receiver of the first transmission information (e-mail) 7a, it is possible to set a time limit on the acquisition of the encryption password 8. Therefore, it is possible to reduce the risk of leakage of the encryption password 8. In this case, a guide sentence for notification of the deadline for access to the first URL can be described in the message body information 71a.

In the first embodiment, the receiver account information (including at least the receiver e-mail address and the receiver password) in the cloud server 3 is stored in the receiver account information database D2 even after processing for returning the encryption password 8 by the encryption password returning means 3M4 is completed. That is, it is preferable that the encryption password 8 is still stored without being deleted from the receiver account information database D2 after the encryption password 8 is returned by the encryption password returning means 3M4. Since the registration information of the receiver is stored in the cloud server 3, the receiver can securely acquire the encryption password 8 for decrypting the encrypted attachment file 73a included in other e-mail 7 using the information communication system S1 according to the first embodiment. That is, if the receiver is once registered on the second terminal 3, the encryption password 8 of another encrypted attachment file 73a can be securely acquired without performing the registration again as long as the information communication system S1 according to the first embodiment is used. In addition, every time the e-mail 7 from a different transmission source (sender) is received, the receiver does not need to perform registration each time in order to acquire the encryption password 8 of the encrypted attachment file 73a.

<Encryption Password Returning Means 3M4>

The encryption password returning means 3M4 has a function of returning the information of the encryption password 8 to the receiving terminal 5 in a confidential state in a case where access to the first URL by the receiving terminal 5 is permitted in the authentication processing of the authentication processing means 3M3. Here, the transmission in a confidential state means communication using an encryption technique between terminals. As the encryption technique for communication in a confidential state, for example, an encryption technique such as secured sockets layer (SSL) or transport layer security (TLS), can be adopted.

In the first embodiment, the second program 33 updates the receipt information database D4 shown in FIG. 6 when the encryption password returning means 3M4 returns the encryption password 8. FIG. 6 is a database configuration diagram of the receipt information database D4. As shown in FIG. 6, the receipt information database D4 is constructed by associating the first URL information 9, the receiver e-mail address 75, and the password acquisition status with each other. In FIG. 6, records D4a and D4b are shown as examples. When the return of the encryption password 8 is completed by the encryption password returning means 3M4, the second program 33 updates the value in the field of "password information status" of the receipt information database D4 from "not acquired" to "acquired". The information of the receipt information database D4 can be set to be transmitted to the transmitting terminal according to the request of the sender. As a result, the sender can check whether or not the receiver has acquired the encryption password 8.

<Second Determination Means 3M5>

The second determination means 3M5 has a function of acquiring source identifying information 6 for specifying the transmission source from the transmitting terminal 1 and determining whether or not the source identifying information 6 is registered in the cloud server 3. It is preferable that the processing of the second determination means 3M5 is performed before the first determination means 3M1 determines whether or not the information 75 of the transmission destination is registered in the cloud server 3 and after receiving a command signal related to the start of processing for transmitting the e-mail 7.

Specifically, the source identifying information 6 means a license information, such as license information issued when the sender registers to the cloud server 3 a license to use the second program 33 or the like of the cloud server 3 or the like in advance. For example, the source identifying information 6 is the license information 6 registered in the license information database D1 as shown in FIG. 7. FIG. 7 is a database configuration diagram of the license information database D1. As shown in FIG. 7, the license information database D1 is constructed by associating information of the license information 6, information of the contract domain and mail address, and information of the contract arrangement with each other. Here, the information of the contract domain and mail address means the e-mail address of the sender or the domain that the sender sets when registering the license. The information of the contract arrangements means the type of contract at the time of license registration. That is, in a case where a "domain" is registered at the time of license registration, the license is registered for each domain of the sender, and the e-mail address belonging to the domain is registered as a sender in the cloud server 3. On the other hand, in a case where an "individual address" is registered at the time of license registration, only the e-mail address related to the contract is licensed and registered as a sender in the cloud server 3. In this license registration, the subscriber is charged according to the contract arrangements of "domain", "individual address", and the number of contracts.

Figure 8:
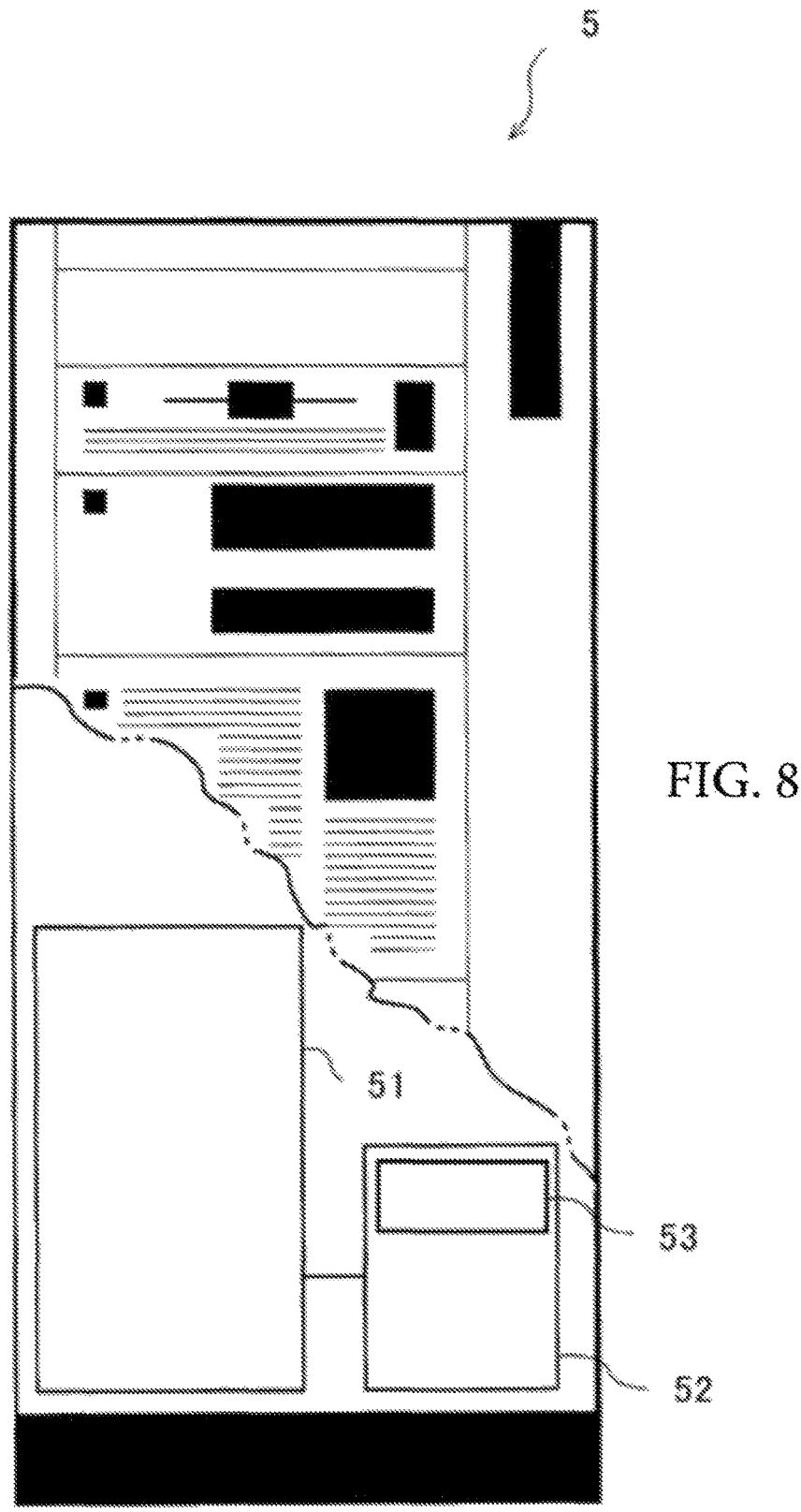
FIG. 8 is a block diagram schematically illustrating the internal configuration of a receiving terminal 5 of the first embodiment.

FIG. 8 is a block diagram schematically illustrating the internal configuration of the receiving terminal 5. The receiving terminal 5 includes a processor (CPU) 51 and a storage device (memory) 52 thereinside. In the first embodiment, the e-mail transmitting and receiving program 53 is stored in the memory 52.

The e-mail transmitting and receiving program 53 may be the same or different from the e-mail transmitting and receiving program 13.

Next, processing in a case where the information 75 of an unregistered transmission destination is present in the determination of the first determination means 3M1 of the second program 33 will be described.

As described above, in the determination of the first determination means 3M1, the second program 33 determines whether or not the information (receiver e-mail address) 75 of the transmission destination is present in the receiver account information database D2 stored in the memory 32 of the cloud server 3. Then, in a case where it is determined that the information (receiver e-mail address) 75 of the transmission destination as a destination designated in the e-mail 7 (in a case where there is a plurality of pieces of information 75 of the transmission destination as a destination, at least a part of the information) is not registered in the receiver account information database D2, the URL information processing means 3M2 generates a second URL information 10 associated with the information 75 of the unregistered transmission destination (receiver e-mail address), and transmits the second URL information 10 to the transmitting terminal 1. Then, the transmission preparation means 1M4 of the first program 14 generates a second transmission information (registration request e-mail) 7b which includes the second URL information 10 in the message body information 71b and which is to be transmitted to the unregistered transmission destination. The generated second transmission information (registration request e-mail) 7b is transmitted to the receiving terminal 5 by the e-mail transmitting and receiving program 13 using a common transmission method. That is, the second URL information 10 may be transmitted as an e-mail by the e-mail transmitting and receiving program 13. In this case, since the e-mail including the second URL information 10 transmitted by the e-mail transmitting and receiving program 13 does not have an attachment file, special encryption processing or the like for the e-mail does not need to be performed.

The second URL information 10 is an URL information generated so as to be associated with the information (receiver e-mail address) 75 of the unregistered transmission destination. The second URL information 10 is a location information of a registration site page for receiver's registration to the cloud server 3. Specifically, the second URL information 10 is an information indicating a location which is accessed by an unregistered receiver and at which an input form for registering the account information is stored. Specifically, the account information is the receiver e-mail address 75 and the receiver password 58 associated with the receiver e-mail address 75. The second program 33 registers account information including the receiver e-mail address 75 and the receiver password 58 in the receiver account information database D2.

A deadline can be set for a period from the transmission of the second transmission information (registration request e-mail) 7b to the reception of the access to a second URL 10 by the receiver. That is, by setting the deadline for the access to the second URL 10 by the receiver of the second transmission information (registration request e-mail) 7b, it is possible to temporally limit a third party impersonating the receiver registering a receiver account even if a third party other than the receiver acquires the registration request e-mail.

For the second program 33, it is preferable that the second determination means 3M5 determines whether or not the source identifying information 6 of the sender is registered in the cloud server 3 before transmitting the second URL information 10 to the transmitting terminal. As a result, a receiver whose receiver account is not registered can register the account only in the case of transmitting the e-mail 7 whose transmission source is a registered sender to the cloud server 3.

Here, registration of account information by a receiver may be performed in two steps. That is, after the second program 33 generates the second URL information 10 and the receiver e-mail address 75 is registered by the receiver on the receiver e-mail address registration page designated by the second URL, then a third URL information 10a may be generated and the receiver may be prompted to set the receiver password 58 on the receiver password registration page designated by the third URL. Specifically, the second program 33 generates, as the second URL information 10, a location information of the receiver e-mail address registration site page for the receiver to register the receiver e-mail address 75 in the cloud server 3 and transmits the location information to the transmitting terminal 1. The e-mail transmitting and receiving program 13 of the transmitting terminal 1 transmits the registration request e-mail 7b including the second URL information 10 to the receiver. The receiver who has received the registration request e-mail 7b accesses the second URL and inputs the receiver e-mail address 75 to the input field of the receiver e-mail address 75 on the displayed receiver e-mail address registration site page to register the receiver e-mail address 75 in the cloud server 3. When the receiver e-mail address 75 is registered by the receiver, the second program 33 generates, as the third URL information 10a, a location information of the receiver password registration site page for the receiver to register the receiver password 58 in the cloud server 3 and transmits the registration request e-mail 7b including the third URL information 10a to the receiver. The receiver who has received the registration request e-mail 7b accesses the third URL and inputs an arbitrary receiver password 58 to the input field of the receiver password 58 on the displayed receiver password registration site page to register the receiver password 58. In this manner, by separately transmitting the second URL information 10 and the third URL information 10a and transmitting the third URL information 10a to the receiving terminal without going through the transmitting terminal 1, the receiver can be notified of the third URL information 10a without notifying the sender of the third URL information 10a.

Figure 9:
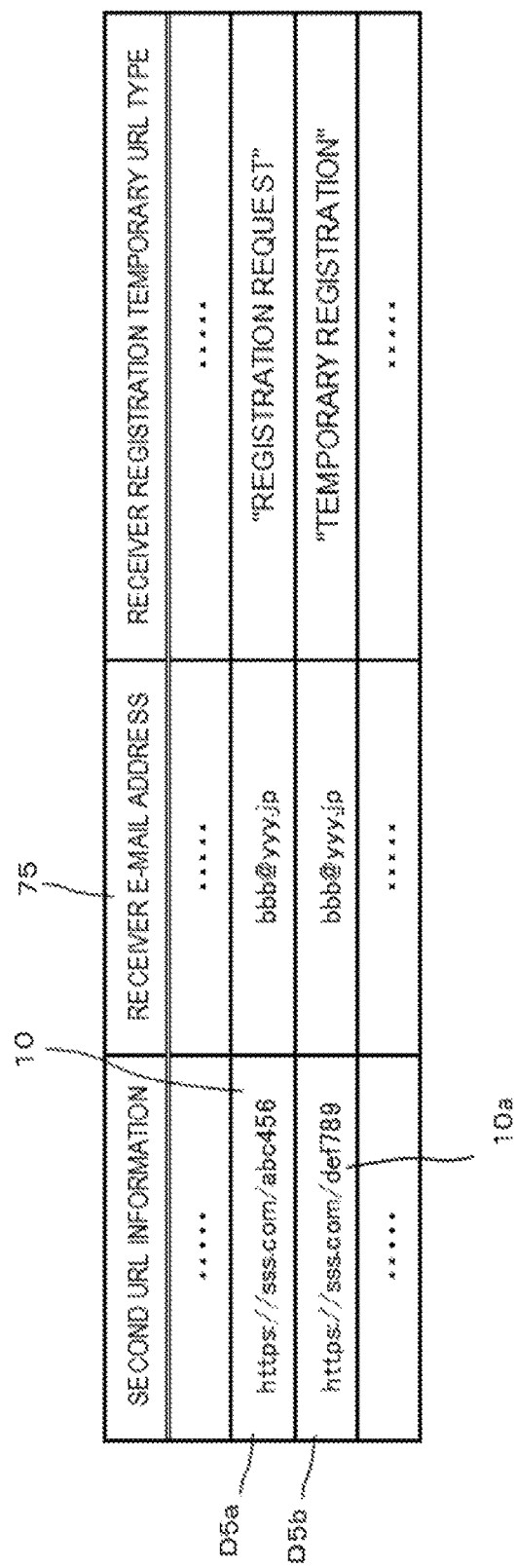
FIG. 9 is a database configuration diagram of a receiver registration temporary URL information database D5 in the case of registering receiver account information in two steps in the first embodiment.

As described above, in a case where the registration of account information by the receiver is performed in two steps, the second URL information 10, the receiver e-mail address 75, and a receiver registration temporary URL type indicating the state of the generated second URL information 10 can be registered in the receiver registration temporary URL information database D5 so as to be associated with each other as shown in FIG. 9. FIG. 9 is a database configuration diagram of the receiver registration temporary URL information database D5 in the case of registering receiver account information in two steps. In FIG. 9, as an example, a record D5a in the case of generating the second URL information 10 for a certain receiver e-mail address 75 and a record D5b in the case of generating the third URL information 10a for the certain receiver e-mail address 75 are shown. Specifically, in the record D5a, a record when the second program 33 generates the second URL information 10, which is the location information of the receiver e-mail address registration site page, is shown. "Receiver registration temporary URL type" in this state is "registration request". In the record D5b, a record when the second program 33 generates the third URL information 10a by registering the receiver e-mail address 75 and transmits the registration request e-mail 7b including the third URL information 10a to the receiver is shown. "Receiver registration temporary URL type" in this state is "temporary registration". The second program 33 can determine the registration status of the receiver by determining a value in the field of "receiver registration temporary URL type".

Needless to say, as a simple method, the second program 33 may generate temporary receiver password 58b as temporary receiver account information together with the second URL information 10 and transmit the temporary receiver password 58b to the transmitting terminal 1 together with the second URL information 10, even though this is weak as a countermeasure against impersonating by the sender or a third party. The temporary receiver password 58b is included in the message body information 71b of the second transmission information (registration request e-mail) 7b together with the second URL information 10 and is transmitted to the receiving terminal 5 by the e-mail transmitting and receiving program 13. The receiver who has received the second URL information 10 and the temporary receiver password 58b accesses a URL (second URL) corresponding to the second URL information 10 and accesses an input form for registering the above-described account information through authentication processing using the temporary receiver password 58b. The receiver can register arbitrary receiver password 58 set by the receiver on the input form.

The second URL information 10 is varied in each piece of information (receiver e-mail address) 75 of the unregistered transmission destination. That is, it is preferable that the second URL information 10 generated for a certain receiver e-mail address 75 does not match the second URL information 10 generated for another receiver e-mail address 75.

In a case where the information 75 of an unregistered transmission destination is present, the transmission preparation means 1M4 of the first program 14 can generate the first transmission information (e-mail) 7a, set only the registered transmission destination as a destination, and delete the information 75 of the unregistered transmission destination from the addressees. As a result, it is possible to transmit the e-mail 7 to at least the registered transmission destinations. In this case, the second program 33 can notify the transmitting terminal 1 that the information 75 of the unregistered transmission destination is present. In addition, in a case where an unregistered receiver has been registered, it is possible to notify the transmitting terminal 1 that the unregistered receiver has been registered. As the notification to the transmitting terminal 1 by the second program 33, for example, an e-mail describing the e-mail address of the unregistered receiver can be transmitted with the sender e-mail address as the addressee. A sender who has been informed that an unregistered receiver is registered can transmit the e-mail 7 again to the newly registered receiver. Needless to say, when the presence of an unregistered receiver is found by the first determination means 3M1, processing for transmitting the e-mail 7 (7a) may be stopped for all receivers to prompt an unregistered receiver to register receiver account information as described above. In this case, by notifying the sender that an unregistered receiver is registered, the sender can transmit the e-mail 7 again to all destinations.

Figure 10:
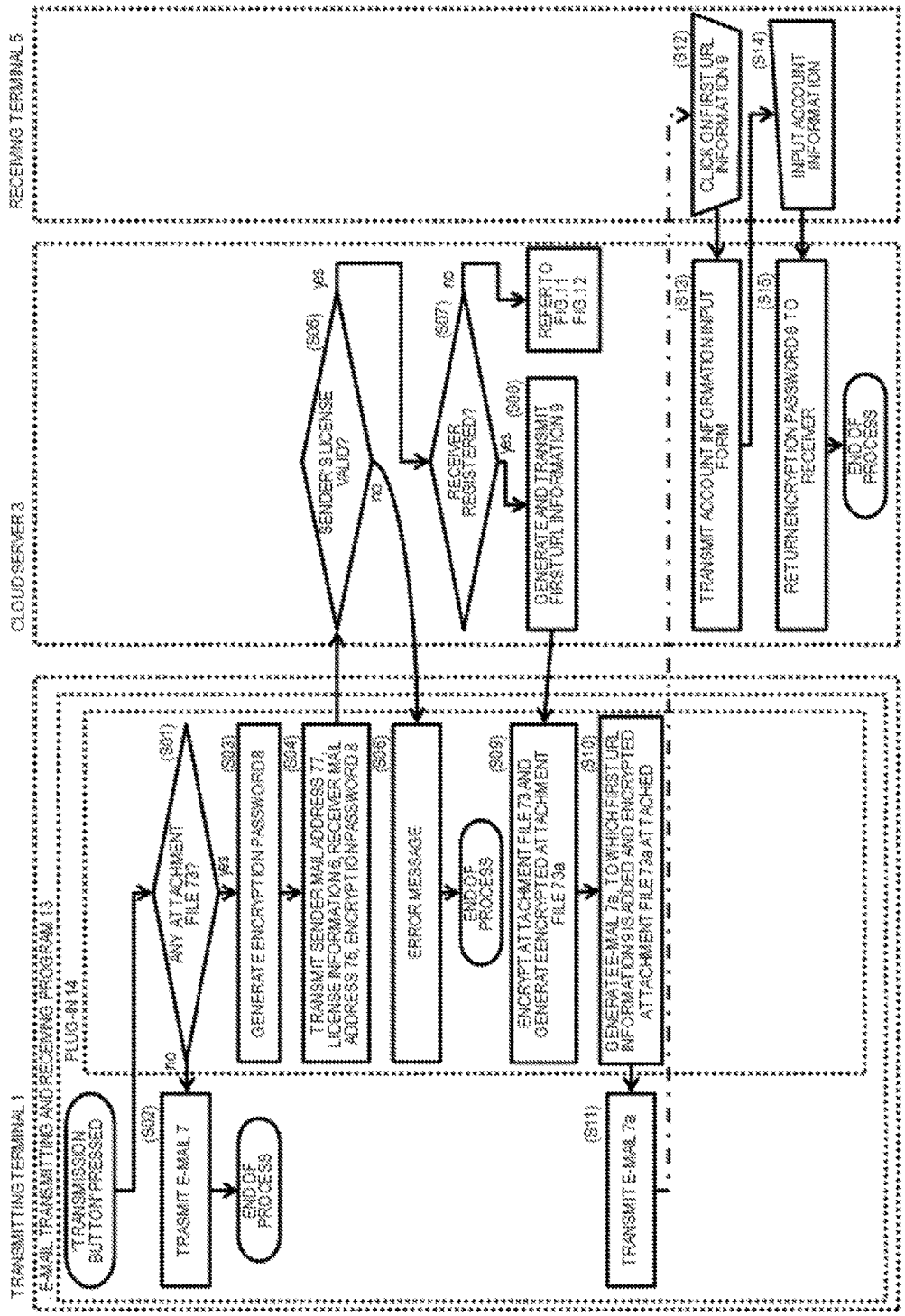
FIG. 10 is a flowchart illustrating the overall operation of the information communication system S1 of the first embodiment.

Next, a specific example in a case where the transmission information 7 is an e-mail in the information communication system S1 according to the first embodiment is described with reference to a flowchart shown in FIG. 10. FIG. 10 is a flowchart illustrating the overall operation of the information communication system S1.

When the sender presses a transmission button to transmit the e-mail 7 using the e-mail transmitting and receiving program 13, the plug-in 14 first determines whether or not the attachment file 73 is attached to the e-mail 7 (S01). In a case where the attachment file 73 is not attached, the process is returned to the e-mail transmitting and receiving program 13, and the e-mail transmitting and receiving program 13 transmits the e-mail 7 (S02). In a case where the attachment file 73 is attached, the encryption password generation means 1M1 generates the encryption password 8 (S03). Then, the encryption password transmission means 1M3 transmits the receiver e-mail address 75, the encryption password 8, and the license information 6 of the sender to the cloud server 3 (S04).

The second program 33 of the cloud server 3 checks the received license information 6 against the license information database D1 to determine the validity of the license (S05). In a case where the license is invalid, the process is returned to the plug-in 14 to display an error message indicating that the license is invalid (S06).

In a case where the license is valid, the first determination means 3M1 determines whether or not the receiver e-mail address 75 is registered in the cloud server 3 (S07). In a case where the receiver is registered, the URL information processing means 3M2 generates the first URL information 9 and transmits the first URL information 9 to the transmitting terminal 1 (S08).

Here, the encryption means 1M2 of the plug-in 14 releases the attachment of the attachment file 73 from the e-mail 7. Then, the encrypted attachment file 73a is generated by encrypting the attachment file 73 using the encryption password 8 (S09). The transmission preparation means 1M4 of the plug-in 14 generates an e-mail 7a, to which the first URL information 9 is added and the encrypted attachment file 73a attached (S10). The plug-in 14 returns the process to the e-mail transmitting and receiving program 13, and the e-mail transmitting and receiving program 13 transmits the e-mail 7a to the receiver e-mail address 75 (S11).

When the receiver who has received the e-mail 7a clicks on the first URL information 9 described in the message body information 71a (S12), the authentication processing means 3M3 of the cloud server 3 transmits an account information input form to the receiving terminal 5 (S13). When the receiver inputs the receiver e-mail address 75 and the receiver password 58 in the account information input form (S14), the authentication processing means 3M3 performs authentication, and the encryption password returning means 3M4 returns the encryption password 8 to the receiving terminal 5 (S15).

Figure 11:
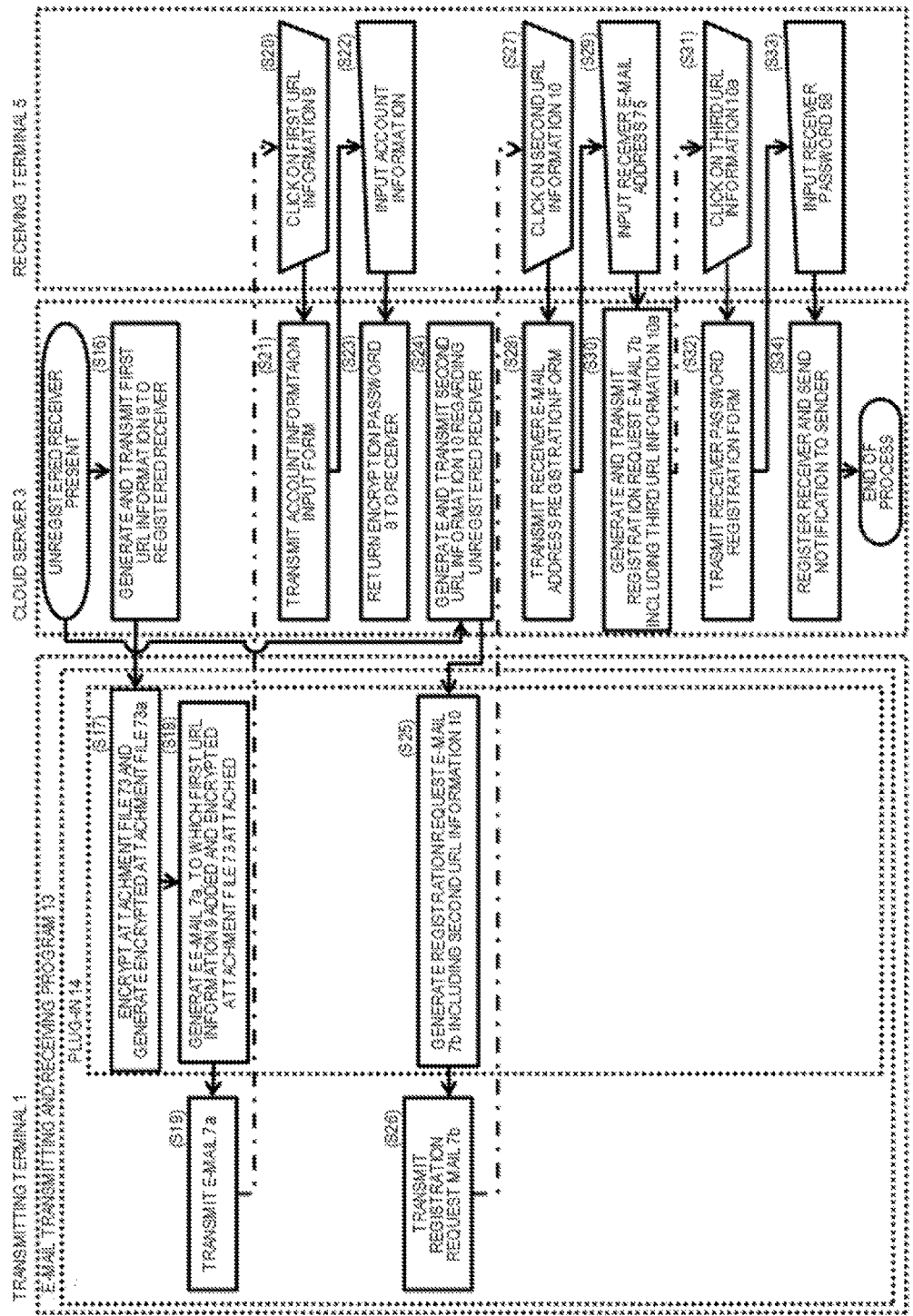
FIG. 11 is a flowchart illustrating a first example of the operation in a case where there is an unregistered receiver in the first embodiment.
Figure 12:
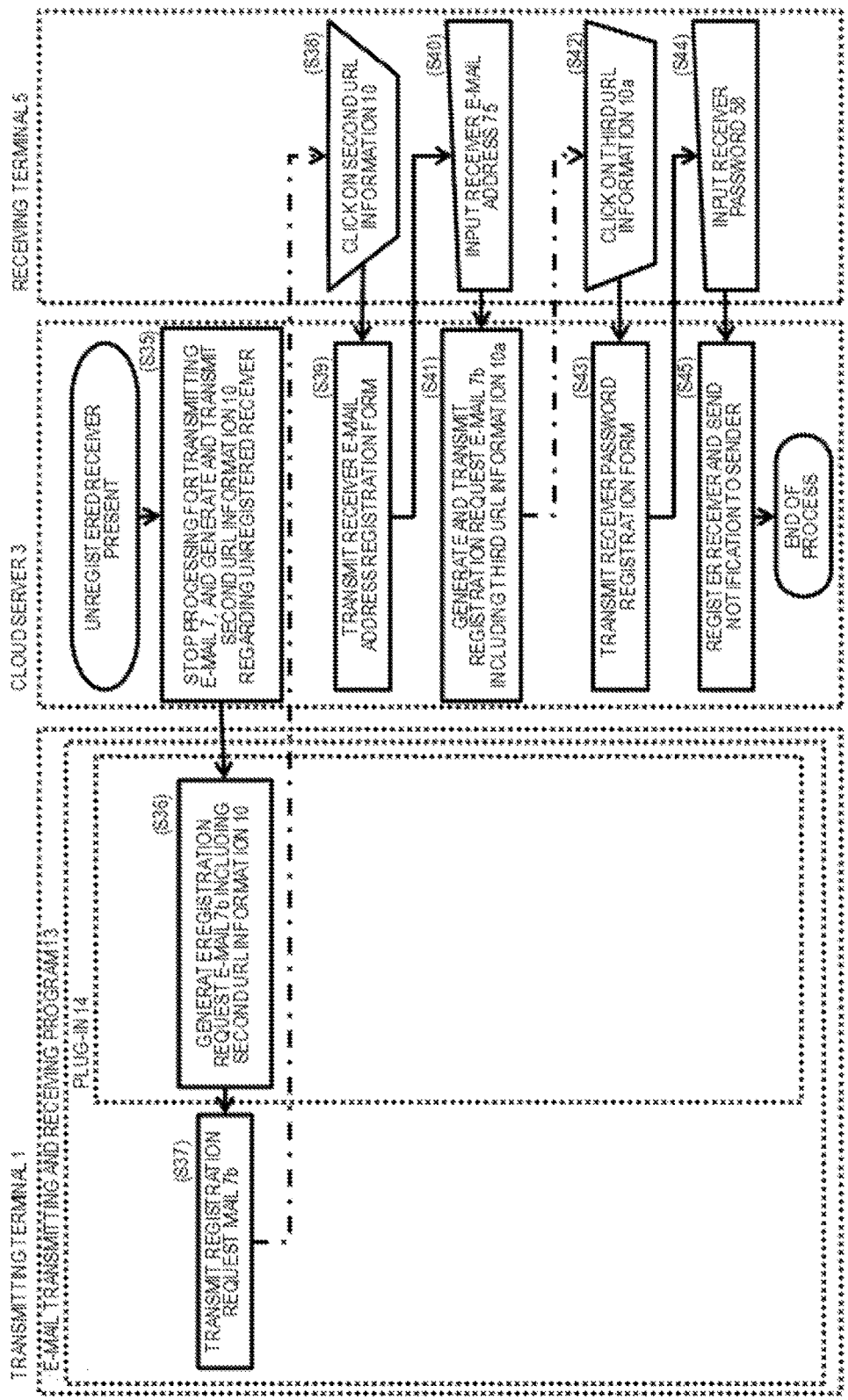
FIG. 12 is a flowchart illustrating a second example of the operation in a case where there is an unregistered receiver in the first embodiment.

Next, a case where the first determination means 3M1 of the cloud server 3 determines that there is an unregistered receiver is described with reference to FIGS. 11 and 12. FIG. 11 is a flowchart illustrating a first example of the operation in a case where there is an unregistered receiver. The first example is an example of a case where the e-mail 7 is transmitted only to registered receivers and the registration request e-mail 7b for prompting the registration of the receiver account is transmitted to unregistered receivers. FIG. 12 is a flowchart illustrating a second example of the operation in a case where there is an unregistered receiver. The second example is an example of a case where, even if there is a registered receiver, processing for transmitting the e-mail 7 (7a) is stopped and the registration request e-mail 7b for prompting the registration of the receiver account is transmitted to unregistered receivers.

In the first example, as shown in FIG. 11, when the first determination means 3M1 determines that there is an unregistered receiver, the URL information processing means 3M2 generates the first URL information 9 only for registered receivers and transmits the generated first URL information 9 to the transmitting terminal 1 (S16).

Here, the encryption means 1M2 of the plug-in 14 releases the attachment of the attachment file 73 from the e-mail 7. Then, the encrypted attachment file 73a is generated by encrypting the attachment file 73 using the encryption password 8 (S17). Then, the transmission preparation means 1M4 of the plug-in 14 generates the e-mail 7a, to which the first URL information 9 is added and the encrypted attachment file 73a attached (S18). The plug-in 14 returns the process to the e-mail transmitting and receiving program 13, and the e-mail transmitting and receiving program 13 transmits the e-mail 7a to the receiver e-mail address (S19).

When the receiver who has received the e-mail 7a clicks on the first URL information 9 described in the message body information 71a (S20), the authentication processing means 3M3 of the cloud server 3 transmits an account information input form to the receiving terminal 5 (S21). When the receiver inputs the receiver e-mail address 75 and the receiver password 58 in the account information input form (S22), the authentication processing means 3M3 performs authentication, and the encryption password returning means 3M4 returns the encryption password 8 to the receiving terminal 5 (S23).

On the other hand, when the first determination means 3M1 determines that there is an unregistered receiver, the cloud server 3 generates the second URL information 10 for the unregistered receiver and transmits the generated second URL information 10 to the transmitting terminal 1 (S24). Incidentally, the processing for generation and transmission of the first URL information 9 for registered receivers in S16 and the processing for generation and transmission of the second URL information 10 for unregistered receivers in S24 may be performed in parallel by the cloud server 3. The plug-in 14 generates the registration request e-mail 7b including the second URL information 10 (S25), and the e-mail transmitting and receiving program 13 transmits the registration request e-mail 7b to the receiver e-mail address (S26).

When the receiver who has received the registration request e-mail 7b clicks on the second URL information 10 described in the message body information 71b (S27), the cloud server 3 transmits a receiver e-mail address registration form for registering the receiver e-mail address 75 to the receiving terminal 5 (S28). When the receiver inputs the receiver e-mail address 75 in the receiver e-mail address registration form (S29), the cloud server 3 generates the registration request e-mail 7b including the third URL information 10a and transmits the generated registration request e-mail 7b to the receiving terminal 5 (S30). When the receiver clicks on the third URL information 10a indicated in the registration request e-mail 7b (S31), the cloud server 3 transmits a receiver password registration form to the receiving terminal 5 (S32). When the receiver inputs the receiver password 58 in the receiver password registration form (S33), the cloud server 3 registers the receiver, and notifies the sender that the receiver has been registered (S34).

In the second example, as shown in FIG. 12, when the first determination means 3M1 determines that there is an unregistered receiver, processing for transmitting the e-mail 7 (7a) is stopped, and the second URL information 10 is generated for the unregistered receiver and transmitted to the transmitting terminal 1. The plug-in 14 generates the registration request e-mail 7b including the second URL information 10 (S36), and the e-mail transmitting and receiving program 13 transmits the registration request e-mail 7b to the receiver e-mail address (S37).

When the receiver who has received the registration request e-mail 7b clicks on the second URL information 10 described in the message body information 71b (S38), the cloud server 3 transmits a receiver e-mail address registration form for registering the receiver e-mail address 75 to the receiving terminal 5 (S39). When the receiver inputs the receiver e-mail address 75 in the receiver e-mail address registration form (S40), the cloud server 3 generates the registration request e-mail 7b including the third URL information 10a and transmits the generated registration request e-mail 7b to the receiving terminal 5 (S41). When the receiver clicks on the third URL information 10a described in the registration request e-mail 7b (S42), the cloud server 3 transmits a receiver password registration form to the receiving terminal 5 (S43). When the receiver inputs the receiver password 58 in the receiver password registration form (S44), the cloud server 3 registers the receiver, and notifies the sender that the receiver has been registered (S45).

There has been described above a first embodiment wherein the first program 14 is stored in a personal computer as the transmitting terminal 1 on which the e-mail transmitting and receiving program 13 is installed, so that the personal computer functions as each means included in the first program 14. However, the first program 14 may not be stored in a storage device of a personal computer used by the sender, or the first program may not allow the personal computer to function as each means included in the first program 14. Specifically, the transmitting terminal 1 in which the first program 14 is stored may be a mail server itself communicably connected to the personal computer in a confidential state, a gateway server disposed between the mail server and the Internet W, or the like.

As described above, in a case where the first program 14 is disposed in a server, such as a mail server or a gateway server, the first determination means 3M1 of the second program 33 transmits a command signal, which is for giving an instruction to transmit the e-mail 7a, to the server in which the first program is disposed when all the receiver e-mail addresses 75 are registered in the receiver account information database D2. Incidentally, in a case where the first program 14 is disposed in a server or the like, when the receiver e-mail address 75 is not registered in the receiver account information database D2, the first determination means 3M1 can notify the sender of the error by automatically transmitting an e-mail to the sender mail address. In addition, a terminal (personal computer) on which the e-mail transmitting and receiving program 13 is installed and a mail server are communicably connected to each other in a confidential state by a mail message. In addition, in a case where the first program 14 is disposed in a gateway, a terminal (personal computer) on which the e-mail transmitting and receiving program 13 is installed and a mail server are communicably connected to each other in a confidential state by a mail message, and the mail server and the gateway are communicably connected to each other in a confidential state by a mail message.

[First Modification Example]

As a modification example of the first embodiment described above, a configuration (first modification example) will be described in which checking is performed based on the information (receiver e-mail address) 75 of the transmission destination when the encryption password returning means 3M4 returns the encryption password 8 to the receiver. Hereinafter, differences from the first embodiment in the first modification example will be described. The configuration of an information communication system according to the following first modification example that is not described is basically the same as the configuration in the information communication system S1 according to the first embodiment.

Before the encryption password returning means 3M4 returns the encryption password 8 to the receiving terminal 5, the second program 33 checks whether or not the receiver e-mail address 75 as the account information input by the receiver is the receiver e-mail address 75 stored in the receipt information database D4. Incidentally, the receipt information database D4 is transmitted from the transmitting terminal 1 to the cloud server 3 by the destination transmission means 1M6, and the receiver e-mail address 75 stored in the receipt information database D4 is stored so as to be associated with the first URL information 9. In a case where the receiver e-mail address 75 input by the receiver is stored in the receipt information database D4 and matches the receiver e-mail address 75 associated with the first URL information 9, the second program 33 returns the encryption password 8 to the receiving terminal 5. In a case where the receiver e-mail address 75 input by the receiver is stored in the receipt information database D4 and does not match the receiver e-mail address 75 associated with the first URL information 9, the second program 33 transmits an error message to the receiving terminal 5 for notification of the error.

With the above configuration, in the first modification example, even in a case where a third party who is neither a sender nor a receiver obtains the e-mail 7a and the third party has an account as a receiver for the cloud server 3, the third party cannot obtain the encryption password 8 since the third party's mail address does not match the receiver e-mail address 75 stored in the receipt information database D4.

[Second Embodiment]

Hereinafter, an information communication system S2 according to a second embodiment will be described with reference to the diagrams. Hereinafter, differences between the information communication system S2 according to the second embodiment and the information communication system S1 according to the first embodiment will mainly be described. The configuration of the information communication system S2 according to the following second embodiment that is not described is basically the same as the configuration in the information communication system S1 according to the first embodiment.

Figure 13:
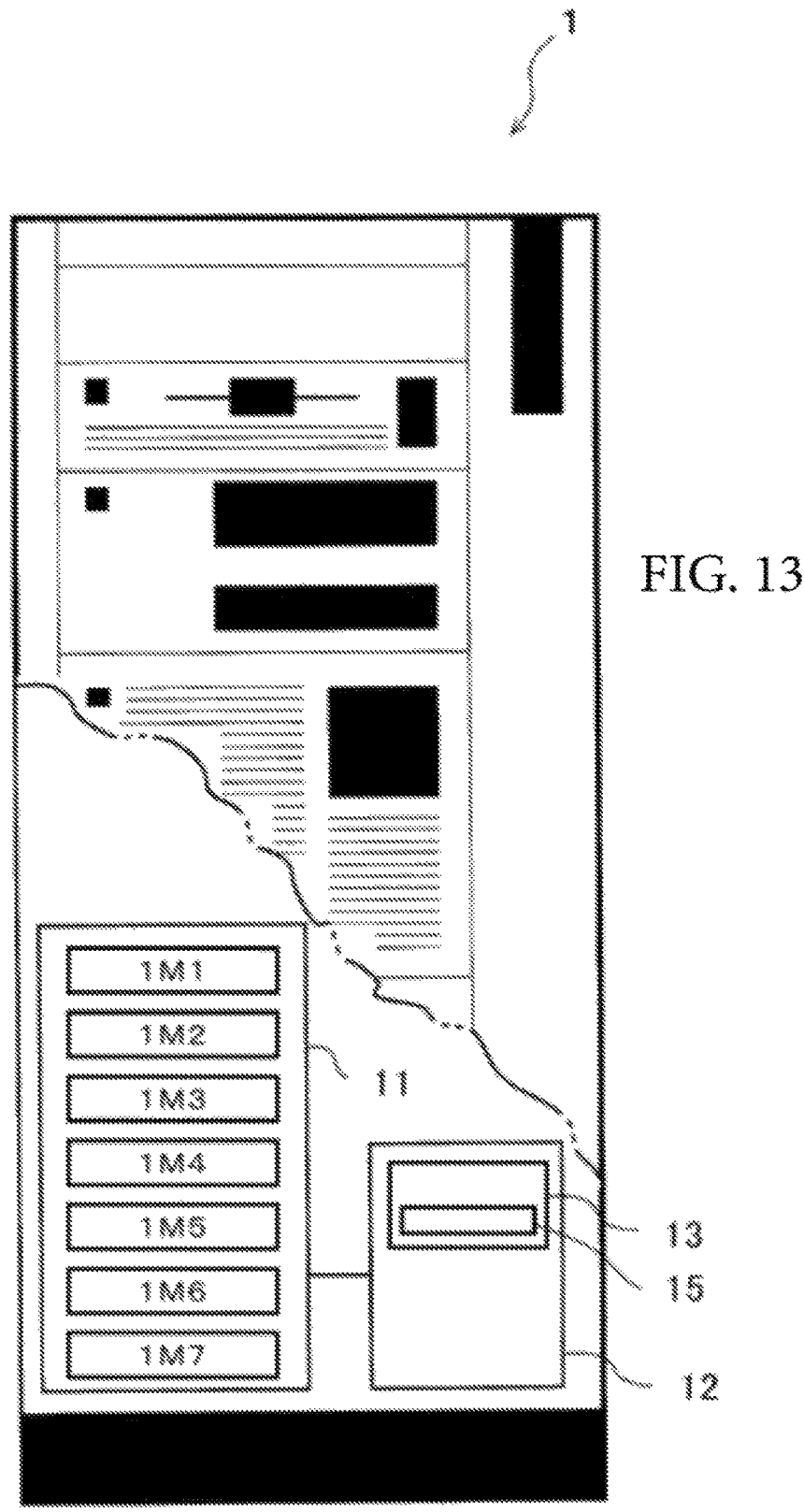
FIG. 13 is a block diagram schematically illustrating the internal configuration of a transmitting terminal 1 of a second embodiment.
Figure 14:
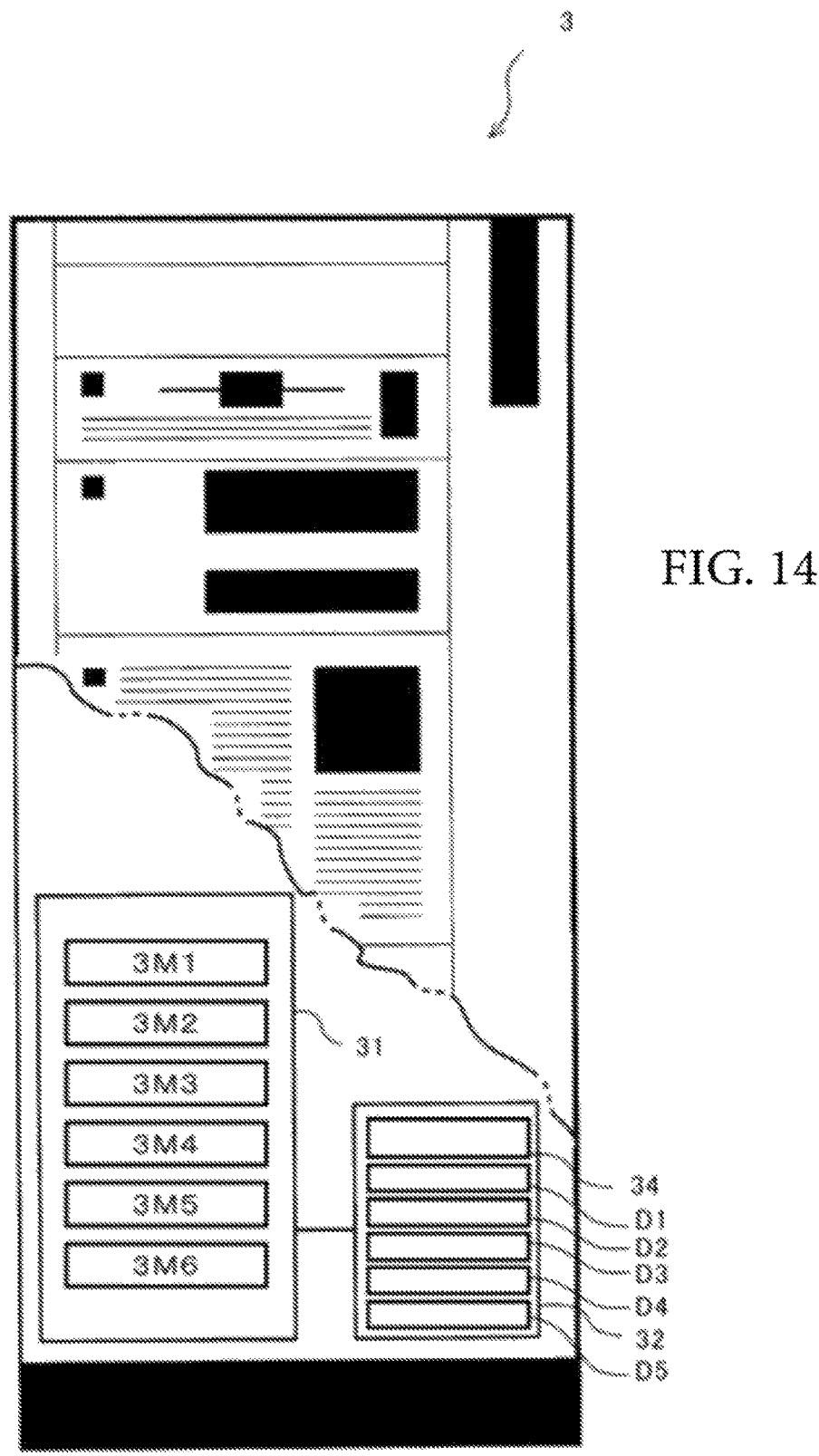
FIG. 14 is a block diagram schematically illustrating the internal configuration of a cloud server 3 of the second embodiment.

FIG. 13 is a block diagram schematically illustrating the internal configuration of the transmitting terminal 1 of the second embodiment. FIG. 14 is a block diagram schematically illustrating the internal configuration of the cloud server 3 of the second embodiment. In the second embodiment, a third program (plug-in) corresponding to the first program (plug-in) 14 of the first embodiment has an attaching module 15a and a transmitting module 15b. In the second embodiment, a fourth program corresponds to the second program 33 of the first embodiment.

The attaching module 15a of the third program 15 allows the transmitting terminal 1 to function as the encryption password generation means 1M1, the encryption means 1M2, the encryption password transmission means 1M3, and the transmission preparation means 1M4. The transmitting module 15b of the third program 15 allows the transmitting terminal 1 to function as the destination transmission means 1M6 and the first URL transmission means 1M7.

\<Attaching Module 15a\>

When the attaching module 15a receives a command signal related to the start of processing for attaching the attachment file 73, the processing of the attaching module 15a is started. The command signal is generated by pressing an "attach" button by the sender and is transmitted to the attaching module 15a. By adding the third program (plug-in) 15 to the e-mail transmitting and receiving program 13, the "attach" button can be displayed on the e-mail editing screen of the e-mail transmitting and receiving program 13, for example.

The attaching module 15a has an attachment file designation means for making the sender designate the attachment file 73. Specifically, the attachment file designation means displays an attachment file designation screen on the display device to allow the sender to designate the attachment file 73 to be attached to the e-mail 7a. As a method by which the sender designates the attachment file 73, for example, a method of designating the location information (path) of the storage location of the data of the attachment file 73 can be mentioned. The sender can designate a plurality of attachment files 73. Incidentally, at this point in time, the attachment file 73 is not attached to the e-mail 7.

On the attachment file designation screen, a "designate file" button, an "encrypt and attach" button, and the like may be disposed. When the sender presses the "designate file" button, a file designation screen is displayed. The sender can designate an attachment file 73 by selecting a file to be attached to the e-mail 7 on the file designation screen. When the sender presses the "encrypt and attach" button, the encryption password generation means 1M1 is executed.

The attaching module 15a generates the encryption password 8 using the encryption password generation means 1M1. In addition, the attaching module 15a transmits the encryption password 8 to the cloud server 3 using the encryption password transmission means 1M3. The encryption password transmission means 1M3 can transmit the sender e-mail address 77 and the license information 6 together with the encryption password 8. Incidentally, the second embodiment is different from the first embodiment in that the information 75 of the transmission destination is not included as information transmitted from the first terminal 1 to the cloud server 3. Since the processing in the second embodiment is divided into processing of the attaching module 15a and processing of the transmitting module 15b, it is possible to change the designation of the receiver e-mail address before starting the processing of the transmitting module 15b.

The cloud server 3 generates the first URL information 9 using the URL information processing means 3M2 when the cloud server 3 receives the encryption password 8. In the second embodiment, a case is described in which the first URL information 9 is a part of the location information of a site page which the receiver accesses to acquire the information of the encryption password. Here, in the following explanation, in a case where the first URL information 9 is a part of the location information of the site page, the part will be referred to as a first URL key 9a. The first URL key 9a is generated so as to be uniquely associated with the encryption password 8. Portions other than the first URL key 9a in the location information of the site page may be common to the first URL information generated for other encryption passwords. The common portion can be, for example, the location information of the storage device 32 of the cloud server 3 in which the information of the site page is stored.

The URL information processing means 3M2 can store the generated first URL key 9a in the encryption password information database D3 so as to be associated with the encryption password 8 or the sender e-mail address 77. In this case, the status of a record related to the first URL key 9a can be set as "temporarily determined". After the processing of the transmitting module 15b to be described later is started, by comparing the first URL key 9a transmitted by the first URL transmission means 1M7 with the above-described "temporarily determined" first URL key 9a of the encryption password information database D3 and checking the presence, the status of the record related to the first URL key 9a in the encryption password information database D3 can be updated to "determined".

The URL information processing means 3M2 transmits the generated first URL key 9a to the transmitting terminal 1. The transmission preparation means 1M4 acquires the first URL key 9a and adds the location information (first URL) of the site page that the receiver accesses to acquire the information of the encryption password to the message body information 71 of the e-mail 7. The location information includes the first URL key 9a.

The encryption means 1M2 encrypts the attachment file designated by the sender using the encryption password 8 to generate the encrypted attachment file 73a. In this case, the file name of the encrypted attachment file 73a can be a file name obtained by adding the first URL key 9a to the file name of the attachment file 73 before encryption. Incidentally, in the first embodiment, a case in which the full path is used as the first URL information 9 has been described. However, in a case where the first URL key 9a is used in the first embodiment, a file name to which the first URL key 9a is added can be used as the file name of the encrypted attachment file 73a.

In the attaching module 15a, the transmission preparation means 1M4 attaches the encrypted attachment file 73a to the e-mail 7 and generates the e-mail 7a in which the first URL including the first URL key 9a is added to the message body information 71. After generating the e-mail 7a, the attaching module 15a ends the process.

\<Transmitting Module 15b\>

When the transmitting module 15b receives a command signal related to the start of processing for transmitting the e-mail 7, the processing of the transmitting module 15b is started. The command signal is generated by pressing a "transmit" button by the sender. By adding the third program (plug-in) 15 to the e-mail transmitting and receiving program 13, the "transmit" button can be displayed on the sender interface of the e-mail transmitting and receiving program 13.

The destination transmission means 1M6 transmits the receiver e-mail address 75 of the e-mail 7 to the cloud server 3. If the "transmit" button is not pressed, the receiver e-mail address 75 may be set in the e-mail 7 before the start of the processing of the attaching module 15a or may be set in the e-mail 7 after the processing of the attaching module 15a has been finished. The destination transmission means 1M6 may transmit the sender e-mail address 77 and the license information 6 to the cloud server 3 together with the receiver e-mail address 75.

\<First URL Transmission Means 1M7\>

The first URL transmission means 1M7 has a function of transmitting the first URL information to the second terminal. The first URL transmission means 1M7 may transmit the sender e-mail address 77 and the license information 6 to the cloud server 3 together with the first URL key 9a. Since the sender e-mail address 77 and the license information 6 are preferably transmitted once to the cloud server 3 as the transmitting module 15b, the destination transmission means 1M6 or the first URL transmission means 1M7 may transmit the sender e-mail address 77 and the license information 6. Incidentally, the destination transmission means 1M6 and the first URL transmission means 1M7 can be combined to perform single transmission processing.

For the receiver e-mail address 75 received from the transmitting terminal 1, the cloud server 3 determines whether or not the receiver e-mail address 75 is registered in the receiver account information database D2 using the first determination means 3M1.

When the first URL key 9a is received, the cloud server 3 searches for a record including the first URL key 9a in the encryption password information database D3 and compares the record with the received first URL key 9a. Then, in a case where the record matches the received first URL key 9a, the status of the record including the first URL key 9a is updated from "temporarily determined" to "determined". In addition, the cloud server 3 registers the receiver e-mail address 75 so as to be associated with the first URL key 9a and the receiver e-mail address 75.

<Transmission Command Signal Transmission Means 3M6>

In a case where the first determination means 3M1 determines that the receiver e-mail address 75 (in a case where a plurality of receiver e-mail addresses 75 are present, all of the receiver e-mail addresses 75) is registered in the receiver account information database D2, the transmission command signal transmission means 3M6 is executed. The transmission command signal transmission means 3M6 has a function of transmitting a command signal for transmitting the e-mail 7a from the cloud server 3 to the transmitting terminal 1. The command signal may be transmitted to a plug-in 15 (transmitting module 15b) or may be transmitted to the e-mail transmitting and receiving program 13. In a case where the command signal is to be transmitted to the plug-in 15 (transmitting module 15b), the plug-in 15 (transmitting module 15b) which receives the command signal transmits a command signal for transmitting the e-mail 7a to the e-mail transmitting and receiving program in order to return the control related to transmission of the e-mail 7a to the e-mail transmitting and receiving program 13. The e-mail transmitting and receiving program 13 which has received the command signal transmits the e-mail 7a.

Figure 15:
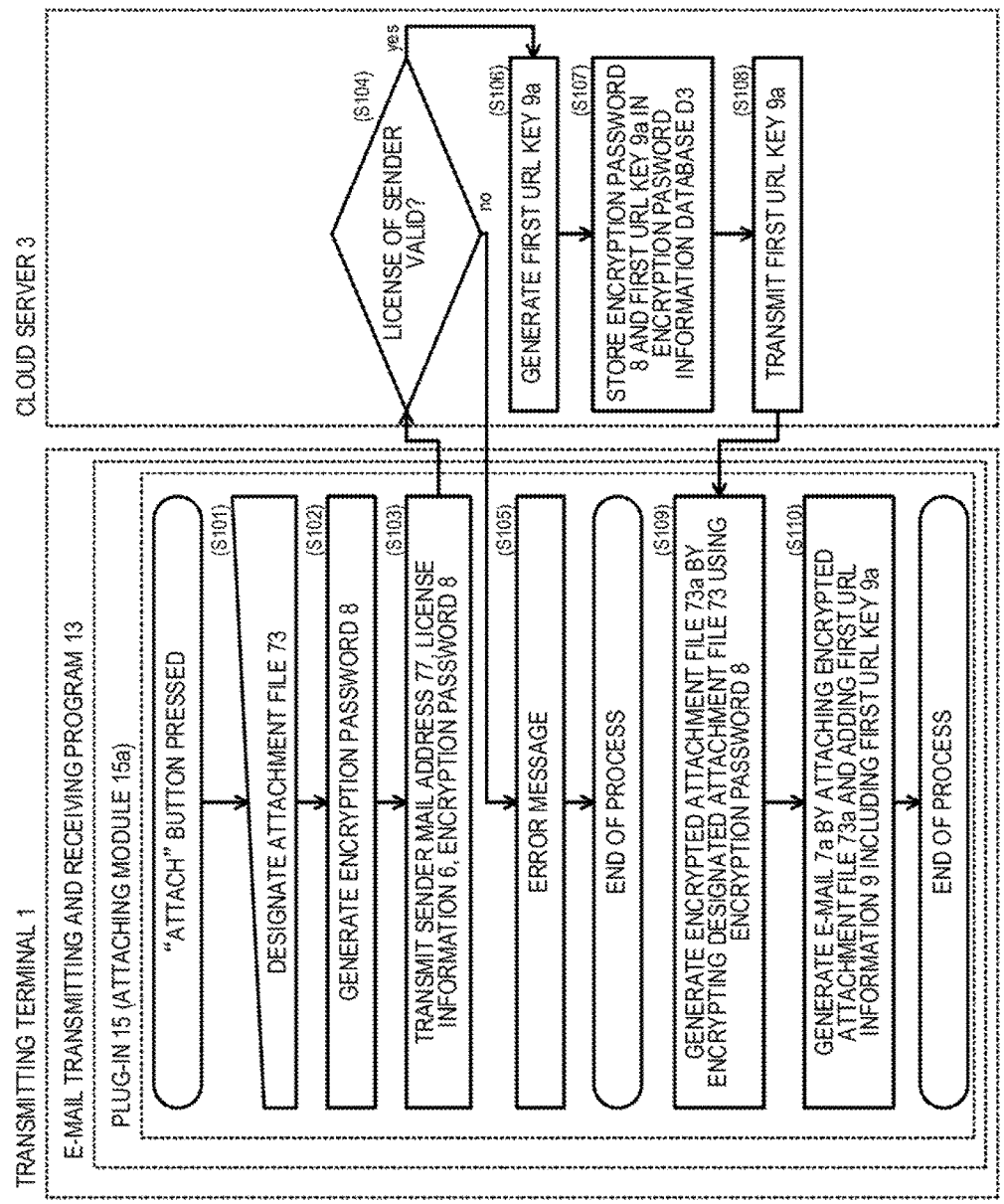
FIG. 15 is a flowchart illustrating the process of an attaching module 15a of the second embodiment.
Figure 16:
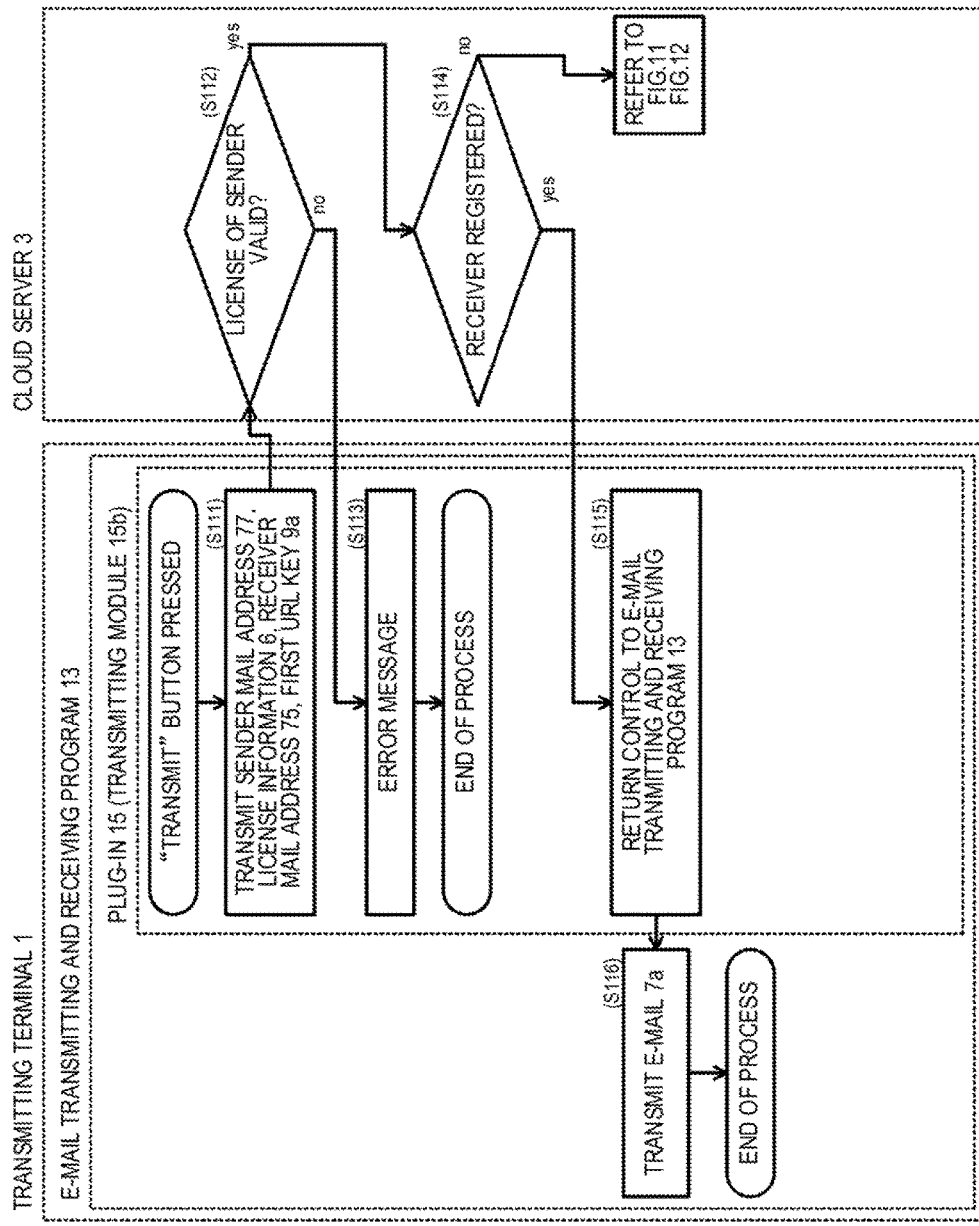
FIG. 16 is a flowchart illustrating the process of a transmitting module 15b of the second embodiment.

Next, the process of the information communication system S2 according to the second embodiment will be described with reference to FIGS. 15 and 16. FIG. 15 is a flowchart illustrating the process of the attaching module 15a of the second embodiment. FIG. 16 is a flowchart illustrating the process of the transmitting module 15b of the second embodiment.

When a sender presses the "attach" button to attach a file to the e-mail 7 using the e-mail transmitting and receiving program 13, the process of the attaching module 15a of the plug-in 15 is started. The attaching module 15a displays the attachment file designation screen on the display device. The sender presses the "designate file" button to designate a file to be attached (S101). After designating a file, when the sender presses the "encrypt and attach" button, the encryption password generation means 1M1 generates the encryption password 8 (S102). Then, the encryption password transmission means 1M3 transmits the sender e-mail address 77 and the license information 6 to the cloud server 3 together with the encryption password 8 (S103).

Based on the received sender e-mail address 77 and license information 6, the cloud server 3 determines whether or not the sender's license is valid by making reference to the license information database D1 (S104). In a case where the license is invalid, the process is returned to the plug-in 15 to display an error message indicating that the license is invalid (S105).

In a case where the license is valid, the URL information processing means 3M2 generates the first URL key 9a (S106) and stores the encryption password 8 and the first URL key 9a in the encryption password information database D3 so as to be associated with each other (S107). In this case, the status of a record related to the first URL key 9a is set as "temporarily determined". The URL information processing means 3M2 transmits the first URL key 9a to the transmitting terminal 1 (S108).

When the attaching module 15a receives the first URL key 9a, the encryption means 1M2 encrypts the designated attachment file 73 to generate the encrypted attachment file 73a (S109). Then, the transmission preparation means 1M4 generates the e-mail 7a by attaching the encrypted attachment file 73a to the e-mail 7 and adding the first URL information 9 including the first URL key 9a to the message body information 71 of the e-mail (S110). Then, the attaching module 15a ends the processing.

Then, when the "transmit" button is pressed in order to transmit the e-mail 7a, the destination transmission means 1M6 and the first URL transmission means 1M7 transmits the sender e-mail address 77, the license information 6, the receiver e-mail address 75, and the first URL key 9a to the cloud server 3 (S111). In this case, the destination transmission means 1M6 and the first URL transmission means 1M7 are combined, and each piece of information is transmitted to the cloud server 3 by one transmission processing.

Based on the received sender e-mail address 77 and license information 6, the cloud server 3 determines whether or not the sender's license is valid with reference to the license information database D1 (S112). In a case where the license is invalid, the process is returned to the plug-in 15 to display an error message indicating that the license is invalid (S113).

In a case where the license is valid, the first determination means 3M1 determines whether or not the receiver e-mail address 75 is registered in the receiver account information database D2 stored in the cloud server 3 (S114). In a case where the receiver e-mail address 75 is not registered (in a case where a plurality of receiver e-mail addresses 75 are present, a case where even one receiver e-mail address is not registered), the process proceeds to the process described in FIG. 11 or 12 as in the first embodiment.

In a case where the receiver e-mail address 75 is registered in the receiver account information database D2 (in a case where a plurality of receiver e-mail addresses 75 are present, a case where all receiver e-mail addresses are registered), the cloud server 3 transmits a command signal for transmitting an e-mail to the transmitting terminal 1.

When the above-described command signal is received, the transmitting module 15b returns the control of transmission of the e-mail 7a to the e-mail transmitting and receiving program 13 (S115), and the e-mail transmitting and receiving program 13 transmits the e-mail 7a (S116). Then, the transmitting module 15b ends the processing.

[Modification Example 2]

As a modification example of the second embodiment described above, a configuration (second modification example) will be described in which checking is performed based on the information (receiver e-mail address) 75 of the transmission destination when the encryption password returning means 3M4 returns the encryption password 8 to the receiver. Hereinafter, differences from the second embodiment in the second modification example will be described. The configuration of an information communication system according to the following second modification example that is not described is basically the same as the configuration in the information communication system S2 according to the second embodiment.

Figure 17:
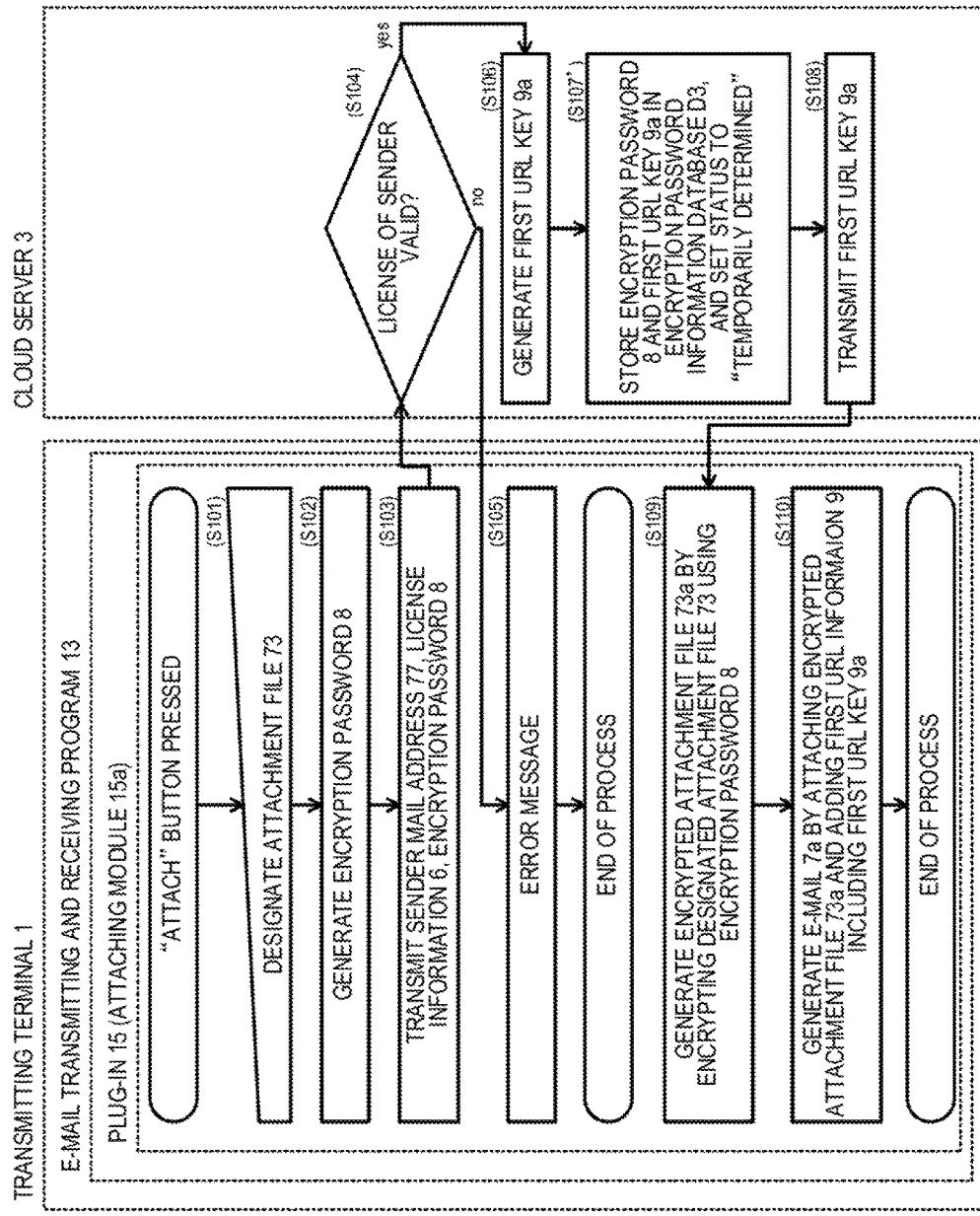
FIG. 17 is a flowchart illustrating the process of an attaching module 15a of a second modification example.
Figure 18:
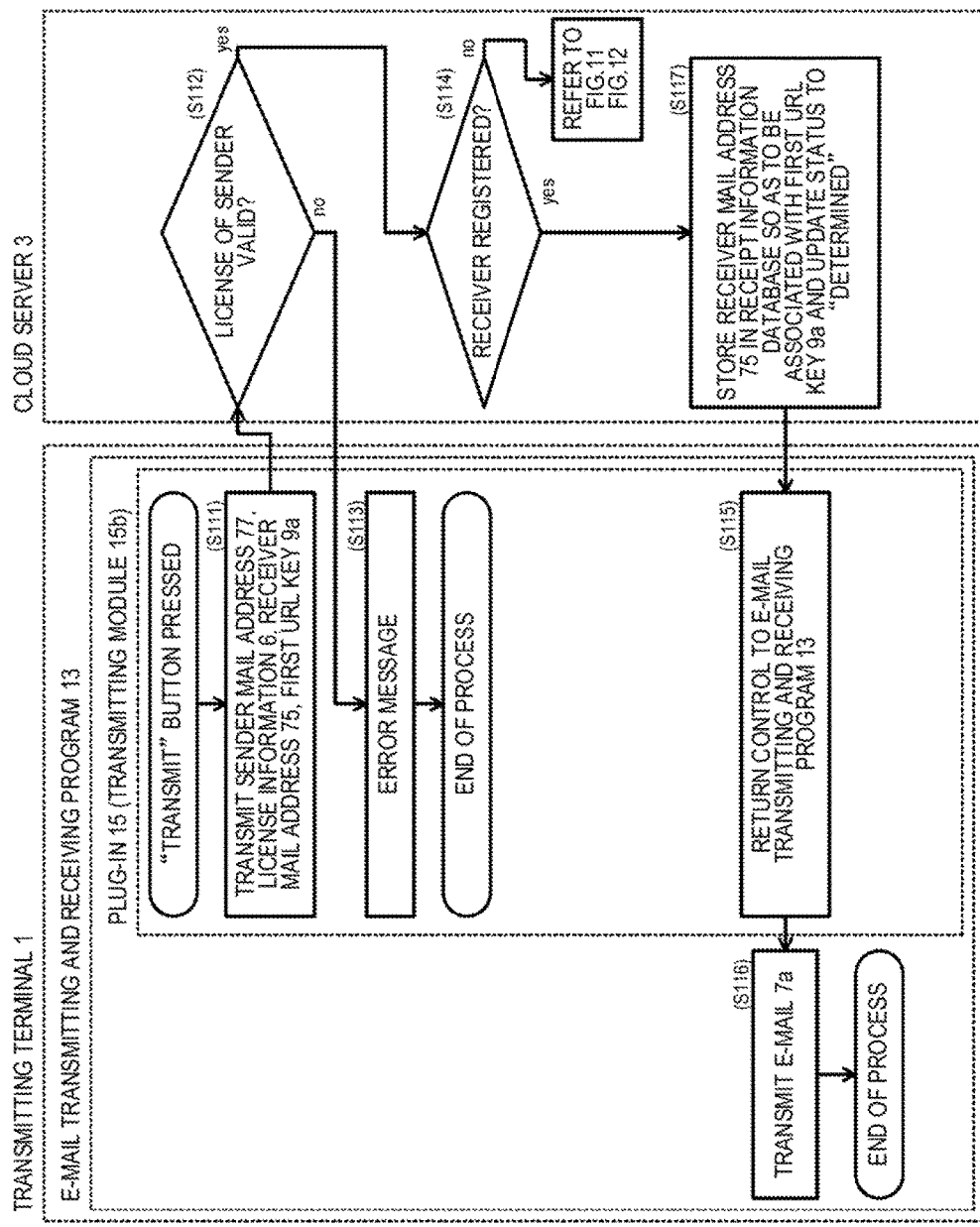
FIG. 18 is a flowchart illustrating the process of a transmitting module 15b of the second modification example.

FIG. 17 is a flowchart illustrating the process of the attaching module 15a of the second modification example. FIG. 17 is different from FIG. 15 in that step S107 is changed to step S107' and the status of the record in the encryption password information database D3 is "temporarily determined". FIG. 18 is a flowchart illustrating the process of the transmitting module 15b of the second modification example. FIG. 18 is different from FIG. 16 in that step S117 is inserted between steps S114 and S115.

In the second modification example, a fourth program 34 may have a receiver e-mail address registration means for storing the receiver e-mail address 75 in the receipt information database D4 after the first determination means 3M1 confirms that the accounts of all receivers are registered.

In the second modification example, when the receiver e-mail address 75 is stored in the receipt information database D4 by the receiver e-mail address registration means, the fourth program 34 can update the status set as "temporarily determined" in the encryption password information database D3 to "determined" using the URL information processing means 3M2.

In addition, in the second modification example, before the encryption password returning means 3M4 returns the encryption password 8 to the receiving terminal 5, the fourth program 34 checks whether or not the receiver e-mail address 75 as the account information input by the receiver is the receiver e-mail address 75 stored in the receipt information database D4. Incidentally, the receipt information database D4 is transmitted from the transmitting terminal 1 to the cloud server 3 by the destination transmission means 1M6, and the receiver e-mail address 75 stored in the receipt information database D4 is stored so as to be associated with the first URL information 9. In a case where the receiver e-mail address 75 input by the receiver is stored in the receipt information database D4 and matches the receiver e-mail address 75 associated with the first URL information 9, the fourth program 34 returns the encryption password 8 to the receiving terminal 5. In a case where the receiver e-mail address 75 input by the receiver is stored in the receipt information database D4 and does not match the receiver e-mail address 75 associated with the first URL information 9, the fourth program 34 transmits an error message to the receiving terminal 5 to notify the receiver of the error.

With the above configuration, in the second modification example, even in a case where a third party who is neither a sender nor a receiver obtains the e-mail 7a and the third party has an account as a receiver for the cloud server 3, the third party cannot obtain the encryption password 8 since the third party's mail address does not match the receiver e-mail address 75 stored in the receipt information database D4.

While the preferred embodiments of the invention have been described above, the invention is not limited thereto, and various modifications or changes can be made within the scope of the gist thereof. For example, the invention includes the following points.

(Point 1) An information communication system includes: a first program stored in a first terminal; and a second program stored in a second terminal. The first terminal is configured to transmit transmission information. The second terminal is configured to communicate with the first terminal through the Internet in a confidential state and to communicate with a third terminal configured to receive the transmission information through the Internet in a confidential state. The transmission information is an information transmitted from a transmission source to a transmission destination, and includes a message body information including a text data and an attachment file attached to the message body information. The first program has an encryption password generation means generating an encryption password for encryption processing on the attachment file; an encryption means performing encryption processing on the attachment file using the encryption password; an encryption password transmission means transmitting information of the encryption password to the second terminal in a confidential state; and a destination transmission means transmitting information of the transmission destination to the second terminal in a confidential state. The second program has a first determination means determining whether or not the information of the transmission destination is registered in the second terminal; and an URL information processing means generating first URL information associated with the information of the encryption password and transmitting the first URL information to the first terminal. The first program further has a transmission preparation means generating a first transmission information which is a transmission information including the first URL information in the message body information and to which an attachment file obtained by performing the encryption processing message body informationis attached to the main body information. The second program further has an authentication processing means performing authentication processing for determining whether or not to permit access to a first URL corresponding to the first URL information included in the first transmission information from the third terminal; and an encryption password returning means returning the information of the encryption password to the third terminal in a confidential state in a case where the access is permitted in the authentication processing. In a case where the first determination means determines that at least a part of the information of the transmission destination is not registered, the URL information processing means generates a second URL information related to an information of an unregistered transmission destination and transmits the second URL information to the first terminal, and the transmission preparation means generates a second transmission information including the second URL information in the message body information and directed to the unregistered transmission destination.

According to this, in a case where an attachment file is attached to transmission information (for example, an e-mail), it is possible to automatically encrypt the attachment file by the information communication system without performing the encryption work on the transmission source (sender) side. The first transmission information having the encrypted attachment file can be transmitted to the transmission destination by an information transmitting and receiving program (for example, a mailer) installed on the first terminal. That is, the first transmission information generated by the transmission preparation means can be automatically transmitted to the transmission destination by an information transmitting and receiving program (for example, an e-mail transmitting and receiving program; hereinafter, referred to as a mailer) or the like. Therefore, the sender can transmit the first transmission information to the transmission destination in a common procedure without being conscious of using separate special programs (first and second programs). The receiver (transmission destination) can also receive the first transmission information from the sender in a normal procedure without being conscious of using separate special programs (first and second programs). The receiver receives the transmission information from the sender without receiving transmission information from the second terminal in normal transmission information transmitting and receiving.

In addition, the sender can securely communicate the encryption password to the transmission destination. Specifically, the receiver accesses the first URL included in the transmission information from the third terminal, so that the encryption password can be securely provided to the receiver. The authentication processing means can perform authentication, for example, by a combination of transmission destination information (for example, a transmission destination e-mail address) and a login password. Communicable between terminals in a confidential state means that communication can be performed by using communication encrypted based on a technique, such as secured sockets layer (SSL) or transport layer security (TLS). Since communication is performed in a confidential state between the first terminal and the second terminal and between the third terminal and the second terminal, it is possible to securely transmit the encryption password or the like.

(Point 2) When the first program receives a command signal related to the start of processing for transmitting the transmission information, the encryption password generation means may generate the encryption password. In a case where the first determination means determines that the information of the transmission destination is registered in the second terminal, the URL information processing means may generate the first URL information and transmit the first URL information to the first terminal.

According to the information communication system S1 according to the first embodiment, the user can encrypt the attachment file 73 and add the first URL information 9 to the mail body simply by pressing the transmission button once.

(Point 3) When the first program receives a command signal related to the start of processing for attaching the attachment file, the encryption password generation means may generate the encryption password. When the first program receives a command signal related to start of processing for transmitting the transmission information, transmission of the information of the transmission destination by the destination transmission means and transmission of the first URL information by a first URL transmission means for transmitting the first URL information to the second terminal may be executed. The second program may further have a transmission command signal transmission means transmitting a command signal for transmitting the transmission information to the first terminal in a case where the first determination means determines that the information of the transmission destination is registered in the second terminal.

According to the information communication system S2 according to the second embodiment, the plug-in 15 can more easily cope with the e-mail transmitting and receiving program 13 having various specifications.

(Point 4) In a case where the first determination means determines that at least a part of the information of the transmission destination is not registered, the transmission preparation means may generate the first transmission information and set only the registered transmission destination as addressee.

In a case where a part of the information of the transmission destination is not registered in the second terminal, the first transmission information (e-mail or the like) which includes the first URL information and to which the encrypted file is attached can be transmitted only to registered transmission destinations.

(Point 5) The second program may further have a second determination means acquiring a source identifying information for specifying the transmission source from the first terminal and determining whether or not the source identifying information is registered in the second terminal before the first determination means determines whether or not the information of the transmission destination is registered in the second terminal and after a command signal related to the start of processing for transmitting the transmission information is received. Only in a case where the second determination means determines that the source identifying information is registered in the second terminal, the first determination means may determine whether or not the information of the transmission destination is registered in the second terminal.

The information communication system can continue processing and proceed to processing for checking the registration of the transmission destination (first determination means) only in a case where the registration (for example, license registration) of the transmission source in the second terminal can be confirmed. Therefore, only the sender (transmission source) registered in the second terminal can securely transmit the encryption password of the attachment file to the receiver. It is possible to prevent a sender who is not registered in the second terminal from using the information communication system.

(Point 6) The first program may further have a destination addition means adding the transmission source to the transmission destination in a case where the transmission source is not included in the transmission destination in the transmission information.

In a case where the transmission source is not included in the information of the transmission destination, the transmission source is added to the transmission destination. As a result, the first transmission information can also be transmitted to the transmission source. The sender (transmission source) can also reliably grasp the encryption password of the attachment file.

(Point 7) There is provided an information communication program stored in at least one of a first terminal and a second terminal; the first terminal configured to transmit transmission information which includes a message body information including text data and an attachment file attached to the message body information and which is transmitted from a transmission source to a transmission destination, and the second terminal configured to communicate with the first terminal in a confidential state and to communicate with a third terminal configured to receive the transmission information in a confidential state. The program allows a computer to function as: an encryption password generation means generating an encryption password for encryption processing of the attachment file; an encryption means performing encryption processing to the attachment file using the encryption password; an encryption password transmission means transmitting information of the encryption password to the second terminal in a confidential state; a destination transmission means transmitting information of the transmission destination to the second terminal in a confidential state; a first determination means determining whether or not the information of the transmission destination is registered in the second terminal; an URL information processing means generating first URL information associated with the information of the encryption password and transmitting the first URL information to the first terminal; a transmission preparation means generating a first transmission information which is a transmission information including the first URL information in the message body information and to which an attachment file obtained by performing the encryption processing message body information is attached to the message body information; an authentication processing means performing authentication processing for determining whether or not to permit access to a first URL corresponding to the first URL information included in the first transmission information from the third terminal; and an encryption password returning means returning the information of the encryption password to the third terminal in a confidential state in a case where the access is permitted in the authentication processing. In a case where the first determination means determines that at least a part of the information of the transmission destination is not registered, the URL information processing means generates a second URL information related to an information of an unregistered transmission destination and transmits the second URL information to the first terminal, and the transmission preparation means generates a second transmission information including the second URL information in the message body information and directed to the unregistered transmission destination.

According to the information communication program, it is possible to obtain the same technical effect as the information communication system as the above-described exemplary aspect.

(Point 8) There is provided an information communication method for providing an encryption password for encryption processing of an attachment file to a third terminal when transmitting transmission information, the transmission information including a message body information including a text data and the attachment file attached to the message body information and which is transmitted from a transmission source to a transmission destination, from a first terminal to the third terminal. The method allows a computer to execute: an encryption password generation step of generating the encryption password after receiving a command signal related to the start of processing for transmitting the transmission information in the first terminal; an encryption step of performing encryption processing to the attachment file using the encryption password; an encryption password transmission step of transmitting information of the encryption password to a second terminal in a confidential state, the second terminal being configured to communicate with the first terminal in a confidential state; a transmission destination transmission step of transmitting information of the transmission destination to the second terminal in a confidential state; a first determination step of determining whether or not the information of the transmission destination is registered in the second terminal; a URL information processing step of generating a first URL information associated with the information of the encryption password and transmitting the first URL information to the first terminal; a transmission preparation step of generating a first transmission information which is a transmission information including the first URL information in the message body information and to which an attachment file obtained by performing the encryption processing message body information is attached to the message body information; an authentication processing step of performing authentication processing for determining whether or not to permit access to a first URL corresponding to the first URL information included in the first transmission information from the third terminal, the third terminal being configured to communicate with the second terminal in a confidential state; and an encryption password returning step of returning the information of the encryption password to the third terminal in a confidential state in a case where the access is permitted in the authentication processing. In a case where it is determined that at least a part of the information of the transmission destination is not registered in the first determination step, the URL information processing means generates a second URL information related to an information of an unregistered transmission destination and transmits the second URL information to the first terminal, and the transmission preparation means generates a second transmission information including the second URL information in the message body information and directed to the unregistered transmission destination.

According to the information communication method, it is possible to obtain the same technical effect as the information communication system as the above-described exemplary aspect.

The system for transmitting and receiving an e-mail with an attachment file and the method for transmitting and receiving an e-mail with an attachment file of the invention enables transmitting and receiving an electronic file easily and securely while using a conventional e-mail transmitting and receiving system.

REFERENCE NUMERALS

1: first terminal (transmitting terminal)
3: second terminal (cloud server)
5: third terminal (receiving terminal)
6: source identifying information (license information)
7: transmission information (e-mail)
7a: first transmission information (e-mail)
7b: second transmission information (registration request e-mail)
8: encryption password
9: first URL information
9a: first URL key
10: second URL information
10a: third URL information
11, 31, 51: processor (CPU)
12, 32, 52: storage device (memory)
13: first information transmitting and receiving program (e-mail transmitting and receiving program)
14: first program (plug-in)
15: third program (plug-in)
15a: attaching module
15b: transmitting module
33: second program
34: fourth program
53: second information transmitting and receiving program (e-mail transmitting and receiving program)
58: receiver password
58b: temporary receiver password
71, 71a, 71b: message body information
73: attachment file
73a: encrypted attachment file
75: information of transmission destination (receiver e-mail address)
77: information of transmission source (sender e-mail address)
1M1: encryption password generation means
1M2: encryption means
1M3: encryption password transmission means
1M4: transmission preparation means
1M5: destination addition means
1M6: destination transmission means 1M7: first URL transmission means
3M1: first determination means
3M2: URL information processing means
3M3: authentication processing means
3M4: encryption password returning means
3M5: second determination means
3M6: transmission command signal transmission means
D1: license information database
D2: receiver account information database
D3: encryption password information database
D4: receipt information database

What is claimed is:

1. An information communication system, comprising:
a first program stored in a first terminal and configured to carry out instructions; and
a second program stored in a second terminal and configured to carry out instructions,
wherein the first terminal is configured to transmit transmission information,
the second terminal is configured to communicate with the first terminal through the Internet in a confidential state and to communicate with a third terminal configured to receive the transmission information through the Internet in a confidential state,
the transmission information is an information transmitted from a transmission source to a transmission destination, and includes a message body information including text data and an attachment file attached to the message body information,
the first program having:
encryption password generation instructions generating an encryption password for encryption processing of the attachment file;
encryption instructions performing encryption processing to the attachment file using the encryption password;
encryption password transmission instructions transmitting information of the encryption password to the second terminal in a confidential state; and
destination transmission instructions transmitting information of the transmission destination to the second terminal in a confidential state,
the second program having:
first determination instructions determining whether or not the information of the transmission destination is registered in the second terminal; and
Uniform Resource Locator (URL) information processing instructions generating a first URL information associated with the information of the encryption password and transmitting the first URL information to the first terminal,
the first program further having transmission preparation instructions generating a first transmission information which is a transmission information including the first URL information in the message body information and to which an attachment file obtained by performing the encryption processing is attached to the main body information,
the second program further having:
authentication processing instructions performing authentication processing for determining whether or not to permit access to a first URL corresponding to the first URL information included in the first transmission information from the third terminal; and
encryption password returning instructions returning the information of the encryption password to the third terminal in a confidential state in a case where the access is permitted in the authentication processing, and
in a case where the first determination instructions determine that at least a part of the information of the transmission destination is not registered, the URL information processing instructions generate a second URL information related to an information of an unregistered transmission destination and transmit the second URL information to the first terminal, and the transmission preparation instructions generate a second transmission information including the second URL information in the message body information and directed to the unregistered transmission destination.

2. The information communication system according to claim 1,
wherein the encryption password generation instructions generate the encryption password when the first program receives a command signal related to start of processing for transmitting the transmission information, and
in a case where the first determination instructions determine that the information of the transmission destination is registered in the second terminal, the URL information processing instructions generate the first URL information and transmit the first URL information to the first terminal.

3. The information communication system according to claim 1,
wherein the encryption password generation instructions generate the encryption password when the first program receives a command signal related to the start of processing for attaching the attachment file,
the transmission of the information of the transmission destination by the destination transmission instructions and transmission of the first URL information by a first URL transmission instructions for transmitting the first URL information to the second terminal are executed when the first program receives a command signal related to start of processing for transmitting the transmission information, and
the second program further has transmission command signal transmission instructions for transmitting a command signal for transmitting the transmission information to the first terminal in a case where the first determination instructions determine that the information of the transmission destination is registered in the second terminal.

4. The information communication system according to claim 1,
wherein, in a case where the first determination instructions determine that at least a part of the information of the transmission destination is not registered, the transmission preparation instructions generate the first transmission information and sets only the registered transmission destination as addressee.

5. The information communication system according to claim 1,
wherein the second program further has second determination instructions acquiring a source identifying information for identifying the transmission source from the first terminal and determining whether or not the source identifying information is registered in the second terminal before the first determination means determines whether or not the information of the transmission destination is registered in the second terminal and after a command signal related to the start of processing for transmitting the transmission information is received, and only in a case where the second determination instructions determine that the source identifying information is registered in the second terminal, the first determination instructions determine whether or not the information of the transmission destination is registered in the second terminal.

6. The information communication system according to claim 1, wherein the first program further has destination addition instructions adding the transmission source to the transmission destination in a case where the transmission source is not included in the transmission destination in the transmission information.

7. A first non-transitory computer-readable medium and a second non-transitory computer-readable medium, each storing respective parts of an information communication program in at least one of a first terminal and a second terminal; the first terminal configured to transmit transmission information which includes a message body information including text data and an attachment file attached to the message body information and which is transmitted from a transmission source to a transmission destination, and the second terminal configured to communicate with the first terminal in a confidential state and to communicate with a third terminal configured to receive the transmission information in a confidential state, the program being executed to carry out a method comprising:

generating an encryption password for encryption processing of the attachment file;

performing encryption processing to the attachment file using the encryption password;

transmitting information of the encryption password to the second terminal in a confidential state;

transmitting information of the transmission destination to the second terminal in a confidential state;

determining whether or not the information of the transmission destination is registered in the second terminal;

generating a first Uniform Resource Locator (URL) information associated with the information of the encryption password and transmitting the first URL information to the first terminal;

generating a first transmission information which is a transmission information including the first URL information in the message body information and to which an attachment file obtained by performing the encryption processing is attached to the message body information;

performing authentication processing for determining whether or not to permit access to a first URL corresponding to the first URL information included in the first transmission information from the third terminal; and returning the information of the encryption password to the third terminal in a confidential state in a case where the access is permitted in the authentication processing, the method further comprising, in a case where it is determined that at least a part of the information of the transmission destination is not registered, generating a second URL information related to an information of an unregistered transmission destination and transmitting the second URL information to the first terminal, and generating a second transmission information including the second URL information in the message body information and directed to the unregistered transmission destination.

8. An information communication method for providing an encryption password for encryption processing of an attachment file to a third terminal when transmitting transmission information; the transmission information including a message body information including text data and the attachment file attached to the message body information and which is transmitted from a transmission source to a transmission destination, from a first terminal to the third terminal, the method comprising:

an encryption password generation step of generating the encryption password after receiving a command signal related to the start of processing for transmitting the transmission information in the first terminal;

an encryption step of performing encryption processing to the attachment file using the encryption password;

an encryption password transmission step of transmitting information of the encryption password to a second terminal in a confidential state, the second terminal configured to communicate with the first terminal in a confidential state;

a transmission destination transmission step of transmitting information of the transmission destination to the second terminal in a confidential state;

a first determination step of determining whether or not the information of the transmission destination is registered in the second terminal;

a URL information processing step of generating a first Uniform Resource Locator (URL) information associated with the information of the encryption password and transmitting the first URL information to the first terminal;

a transmission preparation step of generating a first transmission information which is a transmission information including the first URL information in the message body information and to which an attachment file obtained by performing the encryption processing is attached to the message body information;

an authentication processing step of performing authentication processing for determining whether or not to permit access to a first URL corresponding to the first URL information included in the first transmission information from the third terminal; the third terminal configured to communicate with the second terminal in a confidential state; and an encryption password returning step of returning the information of the encryption password to the third terminal in a confidential state in a case where the access is permitted in the authentication processing, wherein, in a case where it is determined that at least a part of the information of the transmission destination is not registered in the first determination step, the URL information processing means generates a second URL information related to an information of an unregistered transmission destination and transmits the second URL information to the first terminal, and the transmission preparation means generates a second transmission information including the second URL information in the message body information and directed to the unregistered transmission destination.

* * * * *